United States Patent
Yang et al.

(10) Patent No.: US 12,425,506 B2
(45) Date of Patent: Sep. 23, 2025

(54) RECORDING METHOD OF TRUE WIRELESS STEREO EARBUDS AND RECORDING SYSTEM

(71) Applicant: HUAWEI TECHNOLOGIES CO., LTD., Guangdong (CN)

(72) Inventors: Xiao Yang, Shenzhen (CN); Yijun Zhang, Shenzhen (CN); Jianting Feng, Shanghai (CN); Chunjian Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 378 days.

(21) Appl. No.: 17/910,591

(22) PCT Filed: Mar. 10, 2021

(86) PCT No.: PCT/CN2021/079935
§ 371 (c)(1),
(2) Date: Sep. 9, 2022

(87) PCT Pub. No.: WO2021/180115
PCT Pub. Date: Sep. 16, 2021

(65) Prior Publication Data
US 2023/0171337 A1 Jun. 1, 2023

(30) Foreign Application Priority Data
Mar. 13, 2020 (CN) .......... 202010175296.6

(51) Int. Cl.
*G06F 3/16* (2006.01)
*H04M 1/60* (2006.01)
*H04R 1/10* (2006.01)

(52) U.S. Cl.
CPC ........ *H04M 1/6066* (2013.01); *H04R 1/1083* (2013.01); *H04R 2420/07* (2013.01)

(58) Field of Classification Search
CPC .. H04M 1/6066; H04M 2250/02; H04R 1/10; H04R 1/1083; H04R 1/1041;
(Continued)

(56) References Cited

U.S. PATENT DOCUMENTS 5,859,666 A * 1/1999 Manabe ................ H04N 5/772
386/E5.072
9,167,086 B1 10/2015 Gilor
(Continued)

FOREIGN PATENT DOCUMENTS

CN 106028208 A 10/2016
CN 106303789 A 1/2017
(Continued)

*Primary Examiner* — Siu M Lee
(74) *Attorney, Agent, or Firm* — WOMBLE BOND DICKINSON (US) LLP

(57) ABSTRACT

In this application, by using a method for collaborative recording by using a mobile terminal and the true wireless stereo earbud, recording with more complete data amount can be collected, and cooperative noise reduction is performed on a recording signal collected by the mobile terminal and a recording signal collected by the true wireless stereo earbud, so that accuracy and integrity of a human voice signal obtained through separation are higher. Further, in this application, when the true wireless stereo earbud performs recoding in a mode of single-earbud recording, a data amount of the true wireless stereo earbud is relatively small. Therefore, when the mobile terminal receives, through Bluetooth, data sent by the true wireless stereo earbud, excessive occupation of Bluetooth bandwidth of the mobile terminal is avoided, and power consumption of a mobile phone is reduced.

18 Claims, 19 Drawing Sheets

(58) Field of Classification Search
CPC ...... H04R 2420/07; H04R 3/005; H04R 3/12; H04R 2499/11; G06F 3/165; G10H 1/365; G10H 2240/211; G10H 2240/251; G10H 2240/321; H04W 4/80; H04W 56/001; G10L 21/0208; G10L 2021/02082; H04S 2400/15; G01L 19/173
See application file for complete search history.

(56) References Cited

U.S. PATENT DOCUMENTS

| | | | |
|---|---|---|---|
| 10,157,628 B1* | 12/2018 | Liu | G06F 3/167 |
| 12,047,760 B2* | 7/2024 | Yin | H04W 76/15 |
| 2007/0123192 A1* | 5/2007 | Sinai | H04M 1/6066 |
| | | | 455/403 |
| 2017/0047076 A1 | 2/2017 | Shi et al. | |
| 2017/0124045 A1* | 5/2017 | Canton | G06F 3/0482 |
| 2017/0235544 A1* | 8/2017 | Nyegaard | H04L 65/762 |
| | | | 700/94 |
| 2020/0107107 A1* | 4/2020 | Gong | H04W 4/80 |

FOREIGN PATENT DOCUMENTS

| | | | |
|---|---|---|---|
| CN | 108111952 A | | 6/2018 |
| CN | 109246672 A | | 1/2019 |
| CN | 208657030 U | | 3/2019 |
| CN | 110149567 A | | 8/2019 |
| CN | 110460931 A | * | 11/2019 |
| CN | 110491405 A | | 11/2019 |
| CN | 111770403 A | | 10/2020 |

* cited by examiner

CONT.
FROM
FIG. 6(a)-1

A noise reduction filtering module of the true wireless stereo earbud B performs multi-microphone noise reduction on the uplink signal A and the uplink signal B that are obtained after the delay alignment — S65

The processor of the true wireless stereo earbud B performs audio mixing on accompaniment output by the mobile phone and the uplink signal A and the uplink signal B that are obtained after the noise reduction — S66

The processor of the true wireless stereo earbud B plays a downlink signal by using a speaker of the true wireless stereo earbud B, encodes the downlink signal, compresses an encoded downlink signal, and sends the compressed downlink signal to the true wireless stereo earbud A and the mobile phone by using a Bluetooth chip of the true wireless stereo earbud B — S67

The true wireless stereo earbud A decodes the downlink signal, performs digital-to-analog conversion on a decoded digital signal, and plays the downlink signal by using a speaker of the true wireless stereo earbud A in a manner of an analog signal; and after receiving the downlink signal, the mobile phone decodes the downlink signal and transmits a decoded downlink signal to a karaoke application for buffering — S68

End

FIG. 6(a)-2

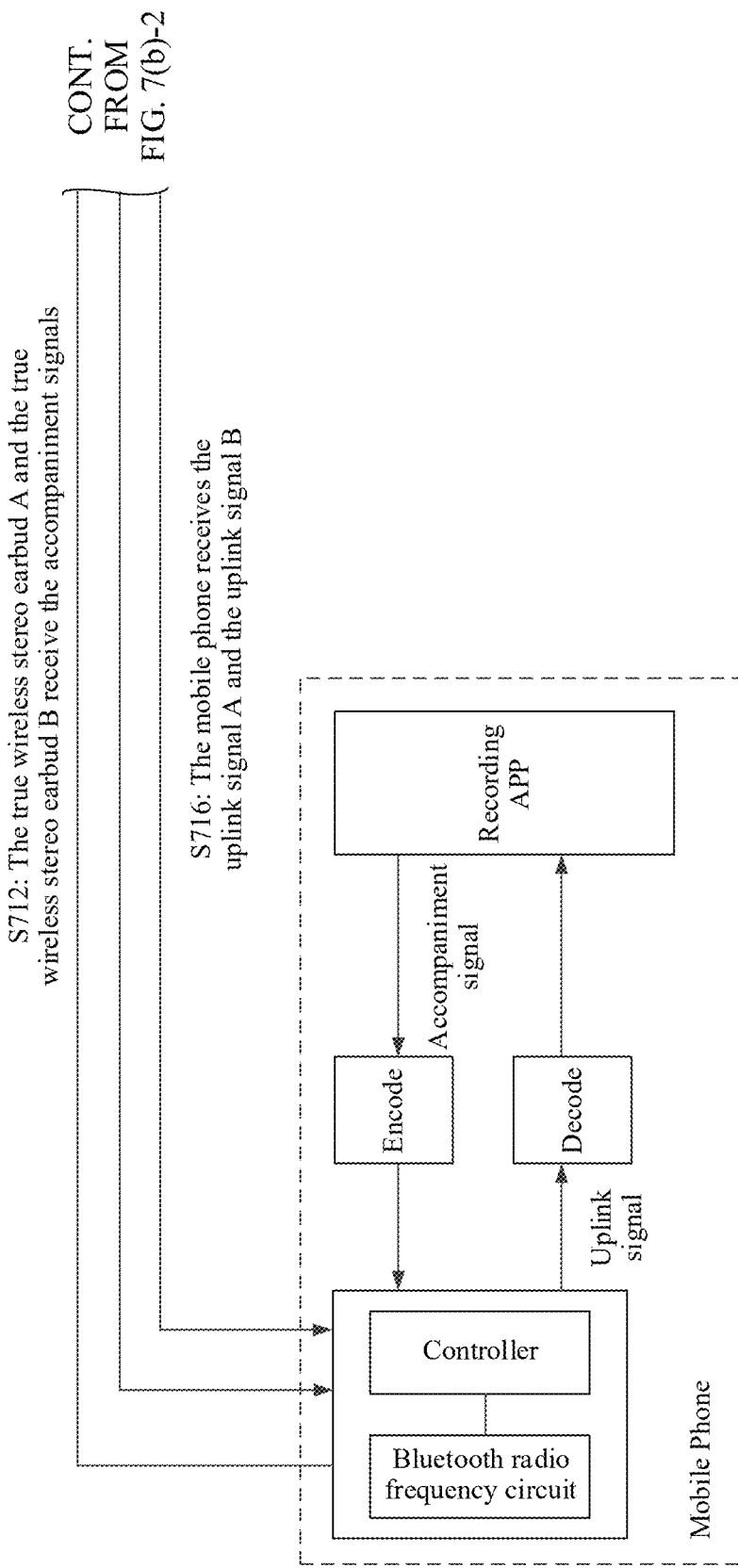

RECORDING METHOD OF TRUE WIRELESS STEREO EARBUDS AND RECORDING SYSTEM

CROSS-REFERENCE TO RELATED APPLICATIONS

This application is a National Stage of International Application No. PCT/CN2021/079935, filed on Mar. 10, 2021, which claims priority to Chinese Patent Application No. 202010175296.6, filed on Mar. 13, 2020. Both of the aforementioned applications are hereby incorporated by reference in their entireties.

TECHNICAL FIELD

This application relates to the field of wireless earbuds, and in particular, to a recording method of true wireless stereo earbuds and a recording system.

BACKGROUND

With development of the Internet, live streaming, mini video shooting, and the like are widely concerned by users. When a mini video is shot or the live streaming is performed, a voice of a user needs to be collected. When a microphone of a mobile terminal (for example, a mobile phone) is used to collect the voice, if the user is far away from the mobile phone, the voice made by the user is easily drowned out and interfered with by ambient noise, and the voice collected by the mobile phone is relatively noisy and has relatively low definition. Therefore, when the user selects wired earphones or a dedicated recording accessory to perform recording, the wired earphones or the dedicated recording accessory needs to be connected to the mobile phone in a wired manner. However, a length of an earphone cable of the wired earphones limits an activity area of the user, thereby causing inconvenience to user activities. To prevent the earphone cable of the wired earphones from limiting the activity area of the user, a dedicated recording accessory shown in FIG. 1 may be used. The dedicated recording accessory shown in FIG. 1 may be directly fastened on a recording interface of the mobile phone. However, a size of the dedicated recording accessory is directly proportional to performance indicators such as sensitivity, bandwidth, frequency response flatness, and acoustic overload point. In other words, a larger size of the recording accessory indicates a better performance indicator. Therefore, the dedicated recording accessory usually has a relatively large size, and is inconvenient for the user to carry.

SUMMARY

An objective of the application is to provide a recording method of true wireless stereo earbuds and a recording system. As a recording device, the true wireless stereo earbud has a relatively small size, is easy to carry and operate by a user, and has a small limitation on an activity area of the user. In addition, a data amount during single-earbud recording is small. Therefore, excessive occupation of Bluetooth bandwidth of a mobile terminal is avoided, and power consumption of the mobile terminal is reduced.

The true wireless stereo earbuds provided in an embodiment of the application include two true wireless stereo earbuds, which are referred to as a first true wireless stereo earbud and a second true wireless stereo earbud in an embodiment of the application. The first true wireless stereo earbud may be a left true wireless stereo earbud or a right true wireless stereo earbud, and the second true wireless stereo earbud may be the left true wireless stereo earbud or the right true wireless stereo earbud. A recording mode of the true wireless stereo earbud may be dual-earbud recording, single-earbud recording, collaborative recording by using dual earbuds and the mobile terminal, or collaborative recording by using a single earbud and the mobile terminal. A manner of communication between the true wireless stereo earbud and the mobile terminal is wireless communication.

According to a first aspect, an embodiment of the application discloses a recording method of true wireless stereo earbuds. The true wireless stereo earbuds include a first true wireless stereo earbud. A single earbud is used for recording. For example, the first true wireless stereo earbud collects a first audio signal, and the first true wireless stereo earbud converts the first audio signal into a first digital audio signal in a PCM format and transmits the first digital audio signal to a mobile terminal. Alternatively, a second true wireless stereo earbud collects a second audio signal, and the second true wireless stereo earbud converts the second audio signal into a second digital audio signal in a PCM format and transmits the second digital audio signal to a mobile terminal.

According to a single-earbud recording method disclosed in an embodiment of the application, when recording is performed by using a true wireless stereo earbud, because the true wireless stereo earbud is wireless, an activity area of a user is not limited. In addition, the true wireless stereo earbud has a relatively small size and is more convenient for the user to carry. When the true wireless stereo earbud performs recording in a mode of single-earbud recording, a data amount of the true wireless stereo earbud is relatively small. Therefore, when the mobile terminal receives, through Bluetooth, data sent by the true wireless stereo earbud, excessive occupation of Bluetooth bandwidth of the mobile terminal is avoided, and power consumption of a mobile terminal is reduced.

In an embodiment of the first aspect of the application, the first true wireless stereo earbud or the second true wireless stereo earbud respectively compresses the first digital audio signal or the second digital audio signal in a form of a digital audio signal in a PCM format and transmits the compressed first digital audio signal or the compressed second digital audio signal to the mobile terminal, by using respective Bluetooth modules. The Bluetooth module includes but is not limited to a Bluetooth radio frequency circuit.

In an embodiment of the first aspect of the application, the first audio signal and the second audio signal are converted into the first digital audio signal in a PCM format and the second digital audio signal in a PCM format by using an analog-to-digital converter and pulse code modulation.

In an embodiment of the first aspect of the application, the mobile terminal may perform noise reduction, filtering, and enhancement on the second digital audio signal from the second true wireless stereo earbud and/or the first digital audio signal from the first true wireless stereo earbud, to eliminate noise in the audio signal. This enhances definition of the audio signal.

In an embodiment of the first aspect of the application, the mobile terminal may perform sampling rate conversion and bit width conversion on the second digital audio signal from the second true wireless stereo earbud and/or the first digital audio signal from the first true wireless stereo earbud, so that a converted sampling rate and a converted bit width of the audio signal are compatible with a mobile phone. This avoids that the audio signal cannot be played or stored.

In an embodiment of the first aspect of the application, the recording method of true wireless stereo earbuds may further be a method for collaborative recording by using the single earbud and the mobile terminal. For example, the mobile terminal receives the second digital audio signal from the second true wireless stereo earbud or the first digital audio signal from the first true wireless stereo earbud. The mobile terminal collects a third audio signal by using a microphone of the mobile terminal and converts the third audio signal into a third digital audio signal. The mobile terminal performs delay alignment on the second digital audio signal from the second true wireless stereo earbud or the first digital audio signal from the first true wireless stereo earbud and the third digital audio signal collected by the mobile terminal. The mobile terminal performs collaborative noise reduction on the first digital audio signal or the second digital audio signal and the third digital audio signal that are obtained after the delay alignment, to obtain a recording signal.

The mobile terminal receives the first true wireless stereo earbud from the first digital audio signal or the second digital audio signal from the second true wireless stereo earbud through Bluetooth communication, and decompresses and decodes the first digital audio signal or the second digital audio signal by using a decoder in an audio module of the mobile terminal, to restore an original audio signal. The decoder in the mobile terminal transmits a decoded audio signal to a processor. The microphone of the mobile terminal transmits the collected audio signal to the processor. The processor of the mobile terminal performs delay alignment on the digital audio signal from the true wireless stereo earbud and the digital audio signal from the microphone of the mobile terminal. The mobile terminal performs, by using a cooperative noise reduction algorithm, cooperative noise reduction on the two audio signals that are obtained after the delay alignment. Then the mobile terminal compensates for a human voice signal obtained after the cooperative noise reduction, and smoothens and outputs the human voice signal.

According to the single-earbud recording method disclosed in an embodiment of the application, when recording is performed by using the true wireless stereo earbud, because the true wireless stereo earbud is wireless, the activity area of the user is not limited. In addition, the true wireless stereo earbud has a relatively small size and is more convenient for the user to carry. When the true wireless stereo earbud performs recording in the mode of single-earbud recording, a data amount of the true wireless stereo earbud is relatively small. Therefore, when the mobile terminal receives, through Bluetooth, data sent by the true wireless stereo earbud, excessive occupation of Bluetooth bandwidth of the mobile terminal is avoided, and power consumption of a mobile phone is reduced. In addition, in the application, by using the method for collaborative recording by using the mobile terminal and the true wireless stereo earbud, recording with more complete data amount can be collected, and cooperative noise reduction is performed on a recording signal collected by the mobile terminal and a recording signal collected by the true wireless stereo earbud, so that accuracy and integrity of the human voice signal obtained through separation are higher.

In an embodiment of the first aspect of the application, karaoke recording may further be performed through collaboration between a single true wireless stereo earbud and the mobile terminal. For example, the first true wireless stereo earbud receives a first accompaniment audio signal from the mobile terminal by using a Bluetooth module and decodes the first accompaniment audio signal, or the second true wireless stereo earbud receives a second accompaniment audio signal from the mobile terminal and decodes the second accompaniment audio signal. The first true wireless stereo earbud performs audio mixing on a decoded first accompaniment audio signal and the first digital audio signal, to obtain a first audio mixing signal, or the second true wireless stereo earbud performs audio mixing on a decoded second accompaniment audio signal and the second digital audio signal, to obtain a second audio mixing signal. The first true wireless stereo earbud converts the first audio mixing signal into an analog audio mixing signal and plays the analog audio mixing signal by using a speaker of the first true wireless stereo earbud, or the second true wireless stereo earbud converts the second audio mixing signal into an analog audio mixing signal and plays the analog audio mixing signal by using a speaker of the second true wireless stereo earbud.

In an embodiment of the first aspect of the application, to ensure that the first true wireless stereo earbud and the second true wireless stereo earbud simultaneously play the first audio mixing signal and the second audio mixing signal, delay alignment is performed before the first true wireless stereo earbud plays the first audio mixing signal and before the second true wireless stereo earbud plays the second audio mixing signal, so that the first audio mixing signal and the second audio mixing signal are synchronously played.

In an embodiment of the first aspect of the application, karaoke recording may further be performed through collaboration between a single true wireless stereo earbud and the mobile terminal. For example, the first true wireless stereo earbud receives and decodes an accompaniment audio signal from the mobile terminal.

The first true wireless stereo earbud performs audio mixing on the second digital audio signal, the first digital audio signal, and a decoded accompaniment audio signal, to obtain an audio mixing signal.

The first true wireless stereo earbud converts the audio mixing signal into a first analog audio mixing signal, and plays the first analog audio mixing signal by using a speaker of the first true wireless stereo earbud.

The first true wireless stereo earbud sends the audio mixing signal to the second true wireless stereo earbud.

The second true wireless stereo earbud decodes the audio mixing signal, converts a decoded audio mixing signal into a second analog audio mixing signal, and plays the second analog audio mixing signal by using a speaker of the second true wireless stereo earbud.

In an embodiment of the first aspect of the application, to ensure that the first true wireless stereo earbud and the second true wireless stereo earbud simultaneously play a first audio mixing signal and a second audio mixing signal, before the first true wireless stereo earbud plays the first analog audio mixing signal, the first true wireless stereo earbud performs delay compensation on the first analog audio mixing signal, so that the first analog audio mixing signal and the second analog audio mixing signal are synchronously played.

According to a second aspect, an embodiment of the application discloses a recording method of true wireless stereo earbuds. For example, two true wireless stereo earbuds are used for recording, and the true wireless stereo earbuds include a first true wireless stereo earbud and a second true wireless stereo earbud. The first true wireless stereo earbud collects a first audio signal. The second true wireless stereo earbud collects a second audio signal. The second true wireless stereo earbud converts the second audio signal into a second digital audio signal in a PCM format and transmits the second digital audio signal to the first true wireless stereo earbud. The first true wireless stereo earbud transmits a first digital audio signal and the second digital audio signal to a mobile terminal. The mobile terminal may be a mobile phone. When a user performs recording by using a true wireless stereo earbud, the user needs to select a recording mode on the mobile phone. After the user opens a "Record Selection" window by using a "Record Selection" icon displayed on a video/audio recording graphical user interface on a display of the mobile phone, the "Record Selection" window displays three recording modes: "True Wireless Stereo Earbud", "Mobile Phone", and "Collaboration Between True Wireless Stereo Earbud and Mobile Phone". After the user taps and selects "True Wireless Stereo Earbud", recording is implemented by using the true wireless stereo earbud.

In an embodiment of the second aspect of the application, the second true wireless stereo earbud collects an original audio signal and modulates the original audio signal into the second digital audio signal in a PCM format by using an analog-to-digital converter and a pulse code modulator. Then, the second true wireless stereo earbud transmits the second digital audio signal to the first true wireless stereo earbud by using a Bluetooth chip. A Bluetooth chip in the first true wireless stereo earbud receives the second digital audio signal from the second true wireless stereo earbud. A processor of the first true wireless stereo earbud controls a decoder to decode the second digital audio signal from the second true wireless stereo earbud, and combines a decoded second digital audio signal with the first digital audio signal of the first true wireless stereo earbud. After the two audio signals are combined, the first true wireless stereo earbud encodes the two audio signals together. The processor controls a Bluetooth radio frequency circuit in the first true wireless stereo earbud to compress the digital audio signals that are encoded together, and transmit the compressed digital audio signals to the mobile terminal (for example, the mobile phone).

According to the recording method of true wireless stereo earbuds disclosed in an embodiment of the second aspect of the application, when recording is performed by using the true wireless stereo earbud, because the true wireless stereo earbud is wireless, an activity area of the user is not limited. In addition, the true wireless stereo earbud has a relatively small size and is more convenient for the user to carry.

In an embodiment of the second aspect of the application, the mobile terminal may perform noise reduction, filtering, and enhancement on the first digital audio signal and the second digital audio signal from the first true wireless stereo earbud, to eliminate noise in the first digital audio signal and the second digital audio signal. This enhances definition of the audio signals.

In an embodiment of the second aspect of the application, the mobile terminal may perform sampling rate conversion and bit width conversion on the first digital audio signal and the second digital audio signal from the first true wireless stereo earbud, so that a converted sampling rate and a converted bit width of the audio signal are compatible with the mobile phone. This avoids that the audio signals cannot be played or stored.

In an embodiment of the second aspect of the application, the recording method of true wireless stereo earbuds may further be a method for collaborative recording by using dual earbuds and the mobile terminal. For example, the mobile terminal receives the first digital audio signal and the second digital audio signal. The mobile terminal collects a third audio signal and converts the third audio signal into a third digital audio signal. The mobile terminal decodes the first digital audio signal and the second digital audio signal, and performs delay alignment on a decoded first digital audio signal, a decoded second digital audio signal, and the third digital audio signal. The mobile terminal performs collaborative noise reduction on the first digital audio signal, the second digital audio signal, and the third digital audio signal that are obtained after the delay alignment, to obtain a recording signal.

The mobile terminal receives the first digital audio signal and the second digital audio signal from the first true wireless stereo earbud through Bluetooth communication, and decompresses and decodes the first digital audio signal and the second digital audio signal by using a decoder in an audio module of the mobile terminal, to restore original audio signals. The decoder in the mobile terminal transmits decoded audio signals to a processor. A microphone of the mobile terminal transmits the collected third audio signal to the processor. The processor of the mobile terminal performs delay alignment on the audio signal from the first true wireless stereo earbud and the third audio signal from the mobile terminal. The processor of the mobile terminal performs, by using a cooperative noise reduction algorithm, cooperative noise reduction on the two audio signals that are obtained after the delay alignment. Then the mobile terminal compensates for a human voice signal obtained after the cooperative noise reduction, and smoothens and outputs the human voice signal.

According to the method for collaborative recording by using the dual earbuds and the mobile terminal disclosed in an embodiment of the application, when recording is performed by using the true wireless stereo earbud, because the true wireless stereo earbud is wireless, an activity area of the user is not limited. In addition, the true wireless stereo earbud has a relatively small size and is more convenient for the user to carry. In addition, in the application, by using the method for collaborative recording by using the mobile terminal and the true wireless stereo earbud, recording with more complete data amount be collected, and cooperative noise reduction is performed on a recording signal collected by the mobile terminal and a recording signal collected by the true wireless stereo earbud, so that accuracy and integrity of the human voice signal obtained through separation are higher.

In an embodiment of the second aspect of the application, karaoke recording may further be performed through collaboration between dual true wireless stereo earbuds and the mobile terminal. For example, the first true wireless stereo earbud receives and decodes a first accompaniment audio signal from the mobile terminal, and the second true wireless stereo earbud receives and decodes a second accompaniment audio signal from the mobile terminal. The first true wireless stereo earbud performs audio mixing on a decoded first accompaniment audio signal and the first digital audio signal, to obtain a first audio mixing signal. The second true wireless stereo earbud performs audio mixing on a decoded second accompaniment audio signal and the second digital audio signal, to obtain a second audio mixing signal. The first true wireless stereo earbud converts the first audio mixing signal into an analog audio mixing signal and plays the analog audio mixing signal by using a speaker of the first true wireless stereo earbud. The second true wireless stereo earbud converts the second audio mixing signal into an analog audio mixing signal and plays the analog audio mixing signal by using a speaker of the second true wireless stereo earbud.

In an embodiment of the second aspect of the application, during karaoke recording, delay alignment is performed before the first true wireless stereo earbud and the second true wireless stereo earbud respectively play the audio mixing signals, so that the first true wireless stereo earbud and the second true wireless stereo earbud simultaneously play the audio mixing signals.

In an embodiment of the second aspect of the application, another karaoke recording may further be performed through collaboration between dual true wireless stereo earbuds and the mobile terminal. For example, the first true wireless stereo earbud receives and decodes an accompaniment audio signal from the mobile terminal. The first true wireless stereo earbud performs audio mixing on the second digital audio signal, the first digital audio signal, and a decoded accompaniment audio signal, to obtain an audio mixing signal. The first true wireless stereo earbud converts the audio mixing signal into a first analog audio mixing signal and plays the first analog audio mixing signal by using a speaker of the first true wireless stereo earbud. The first true wireless stereo earbud sends the audio mixing signal to the second true wireless stereo earbud. The second true wireless stereo earbud decodes the audio mixing signal, converts a decoded audio mixing signal into a second analog audio mixing signal, and plays the second analog audio mixing signal by using a speaker of the second true wireless stereo earbud.

In an embodiment of the second aspect of the application, the first true wireless stereo earbud performs delay alignment on the second digital audio signal from the second true wireless stereo earbud and the first digital audio signal collected by the first true wireless stereo earbud, so that the first true wireless stereo earbud and the second true wireless stereo earbud simultaneously play the audio mixing signals.

In an embodiment of the second aspect of the application, before the first true wireless stereo earbud plays the first analog audio mixing signal, the first true wireless stereo earbud performs delay compensation on the first analog audio mixing signal, so that the second true wireless stereo earbud and the first true wireless stereo earbud simultaneously play the audio mixing signals.

According to a third aspect, an embodiment of the application discloses a recording system. In the recording system including a mobile terminal and true wireless stereo earbuds, the true wireless stereo earbuds include two true wireless stereo earbuds, which are referred to as a first true wireless stereo earbud and a second true wireless stereo earbud in an embodiment of the application. The first true wireless stereo earbud (a true wireless stereo earbud A) may be a left true wireless stereo earbud or a right true wireless stereo earbud, and the second true wireless stereo earbud (a true wireless stereo earbud B) may be the left true wireless stereo earbud or the right true wireless stereo earbud. A recording mode of the true wireless stereo earbud may be dual-earbud recording, single-earbud recording, collaborative recording by using dual earbuds and the mobile terminal, or collaborative recording by using a single earbud and the mobile terminal. The mobile terminal may be a mobile phone. A user may shoot a mini video, broadcast online, sing karaoke, and the like by using the mobile phone and the true wireless stereo earbud. In addition, the user may query, by using a corresponding audio recording APP, whether the mobile phone supports recording by using the true wireless stereo earbud, and may control an audio signal from the true wireless stereo earbud or an audio signal from the mobile phone to be input into the audio recording APP. After the user opens a "Record Selection" window by using a "Record Selection" icon displayed on a video/audio recording graphical user interface of the mobile phone, the "Record Selection" window displays three recording modes: "True Wireless Stereo Earbud", "Mobile Phone", and "Collaboration Between True Wireless Stereo Earbud and Mobile Phone". After the user selects "True Wireless Stereo Earbud", recording is implemented by using the true wireless stereo earbud.

The recording system disclosed in an embodiment of the application includes the first true wireless stereo earbud and the mobile terminal. The first true wireless stereo earbud is wirelessly connected to the mobile terminal.

The first true wireless stereo earbud collects a first audio signal.

The first true wireless stereo earbud converts the first audio signal into a first digital audio signal in a PCM format and transmits the first digital audio signal to the mobile terminal.

According to the recording system disclosed in an embodiment of the application, when recording is performed by using the true wireless stereo earbud, because the first true wireless stereo earbud is wirelessly connected to the mobile terminal, an activity area of the user is not limited. In addition, the true wireless stereo earbud has a relatively small size and is more convenient for the user to carry. In addition, when the true wireless stereo earbud performs recording in a mode of single-earbud recording, a data amount of the true wireless stereo earbud is relatively small. Therefore, when the mobile terminal receives, through Bluetooth, data sent by the true wireless stereo earbud, excessive occupation of Bluetooth bandwidth of the mobile terminal is avoided, and power consumption of the mobile terminal is reduced.

In an embodiment of the third aspect of the application, the recording system further includes a second true wireless stereo earbud. The second true wireless stereo earbud is wirelessly connected to the first true wireless stereo earbud and the mobile terminal. The second true wireless stereo earbud collects a second audio signal. The second true wireless stereo earbud converts the second audio signal into a second digital audio signal in a PCM format and transmits the second digital audio signal to the first true wireless stereo earbud. The first true wireless stereo earbud transmits the first digital audio signal and the second digital audio signal to the mobile terminal.

In an embodiment of the third aspect of the application, the first audio signal and the second audio signal are converted into the first digital audio signal in a PCM format and the second digital audio signal in a PCM format by using an analog-to-digital converter and pulse modulation. The mobile terminal is configured to perform noise reduction, filtering, sampling rate conversion, and bit width conversion on the first digital audio signal and the second digital audio signal.

In an embodiment of the third aspect of the application, the mobile terminal is further configured to perform collaborative recording together with the first true wireless stereo earbud. The collaborative recording includes: The mobile terminal receives the first digital audio signal. The mobile terminal collects a third audio signal and converts the third audio signal into a third digital audio signal. The mobile terminal decodes the first digital audio signal, and performs delay alignment on a decoded first digital audio signal and the third digital audio signal. The mobile terminal performs collaborative noise reduction on the first digital audio signal and the third digital audio signal that are obtained after the delay alignment, to obtain a recording signal.

In an embodiment of the third aspect of the application, the mobile terminal is further configured to perform collaborative recording together with the first true wireless stereo earbud and the second true wireless stereo earbud. The collaborative recording includes: The mobile terminal receives the first digital audio signal and the second digital audio signal. The mobile terminal collects a third audio signal and converts the third audio signal into a third digital audio signal. The mobile terminal decodes the first digital audio signal and the second digital audio signal, and performs delay alignment on a decoded first digital audio signal, a decoded second digital audio signal, and the third digital audio signal. The mobile terminal performs collaborative noise reduction on the first digital audio signal, the second digital audio signal, and the third digital audio signal that are obtained after the delay alignment, to obtain a recording signal.

In an embodiment of the third aspect of the application, the first true wireless stereo earbud receives and decodes a first accompaniment audio signal from the mobile terminal, and/or the second true wireless stereo earbud receives and decodes a second accompaniment audio signal from the mobile terminal. The first true wireless stereo earbud performs audio mixing on a decoded first accompaniment audio signal and the first digital audio signal, to obtain a first audio mixing signal, and/or the second true wireless stereo earbud performs audio mixing on a decoded second accompaniment audio signal and the second digital audio signal, to obtain a second audio mixing signal. The first true wireless stereo earbud converts the first audio mixing signal into an analog audio mixing signal and plays the analog audio mixing signal by using a speaker of the first true wireless stereo earbud, and/or the second true wireless stereo earbud converts the second audio mixing signal into an analog audio mixing signal and plays the analog audio mixing signal by using a speaker of the second true wireless stereo earbud.

In an embodiment of the third aspect of the application, the first true wireless stereo earbud receives and decodes an accompaniment audio signal from the mobile terminal. The first true wireless stereo earbud performs audio mixing on the second digital audio signal, the first digital audio signal, and a decoded accompaniment audio signal, to obtain an audio mixing signal. The first true wireless stereo earbud converts the audio mixing signal into a first analog audio mixing signal and plays the first analog audio mixing signal by using a speaker of the first true wireless stereo earbud. The first true wireless stereo earbud sends the audio mixing signal to the second true wireless stereo earbud. The second true wireless stereo earbud decodes the audio mixing signal, converts a decoded audio mixing signal into a second analog audio mixing signal, and plays the second analog audio mixing signal by using a speaker of the second true wireless stereo earbud.

Other features and corresponding advantageous effect of the application are described in the following of this specification. In addition, it should be understood that at least some of the advantageous effects are obvious in the descriptions in this specification of the application.

BRIEF DESCRIPTION OF DRAWINGS

FIG. 3(b)-1 and FIG. 3(b)-2 are a signal flow diagram of a single-earbud recording method according to an embodiment of the application;

FIG. 4(b)-1 and FIG. 4(b)-2 are a signal flow diagram of a dual-earbud recording method according to an embodiment of the application;

FIG. 6(a)-1 and FIG. 6(a)-2 are a schematic flowchart of a karaoke recording method of true wireless stereo earbuds according to an embodiment of the application; and FIG. 6(b)-1, FIG. 6(b)-2, and FIG. 6(b)-3 are a signal flow diagram of a karaoke recording method of true wireless stereo earbuds according to an embodiment of the application;

FIG. 7(b)-1, FIG. 7(b)-2, and FIG. 7(b)-3 are a signal flow diagram of another karaoke recording method of true wireless stereo earbuds according to an embodiment of the application.

DESCRIPTION OF EMBODIMENTS

Figure 1:
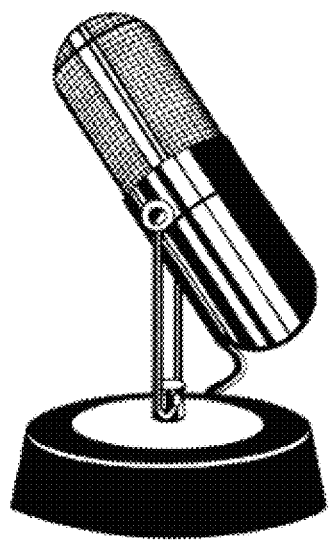
FIG. 1 is a schematic diagram of a structure of a recording accessory in the conventional technology.

The following describes implementations of the application by using embodiments. One of ordinary skilled in the art may easily learn of other advantages and functions of the application based on content disclosed in this specification. Although the application is described with reference to Embodiment 1, it does not mean that a characteristic of the application is limited only to this implementation. On the contrary, a purpose of describing the application with reference to an implementation is to cover another option or modification that may be derived based on claims of the application. To provide an in-depth understanding of the application, the following descriptions include a plurality of details. This application may be alternatively implemented without using these details. In addition, to avoid confusion or blurring the focus of the application, some details will be omitted from the description. It should be noted that embodiments in the application and the features in embodiments may be mutually combined in the case of no conflict.

It should be noted that, in this specification, similar reference numerals and letters in the following accompanying drawings represent similar items. Therefore, once an item is defined in an accompanying drawing, the item does not need to be further defined or interpreted in subsequent accompanying drawings.

The following clearly and completely describes the technical solutions of the application with reference to the accompanying drawings. It is clear that the described embodiments are some but not all of the embodiments of the application. All other embodiments obtained by one of ordinary skilled in the art based on embodiments of the application without creative efforts shall fall within the protection scope of the application. In addition, technologies well known to one of ordinary skilled in the art may also be used as a part of embodiments of the application. Details are not described again in the application.

It may be understood that, as used in the application, the term "module" may refer to or include an application-specific integrated circuit (ASIC), an electronic circuit, a processor (a shared processor, a dedicated processor, or a processor group) and/or a memory that executes one or more software or firmware programs, a combinational logic circuit, and/or other appropriate hardware components that provide the described functions, or may be a part of these hardware components.

It can be understood that in an embodiment of the application, a processor may be a microprocessor, a digital signal processor, a microcontroller, or the like, and/or any combination thereof. According to another aspect, the processor may be a single-core processor, a multi-core processor, or the like, and/or may be any combination thereof.

To make the objectives, technical solutions, and advantages of the application clearer, the following further describes implementations of the application in detail with reference to the accompanying drawings.

Figure 2A:
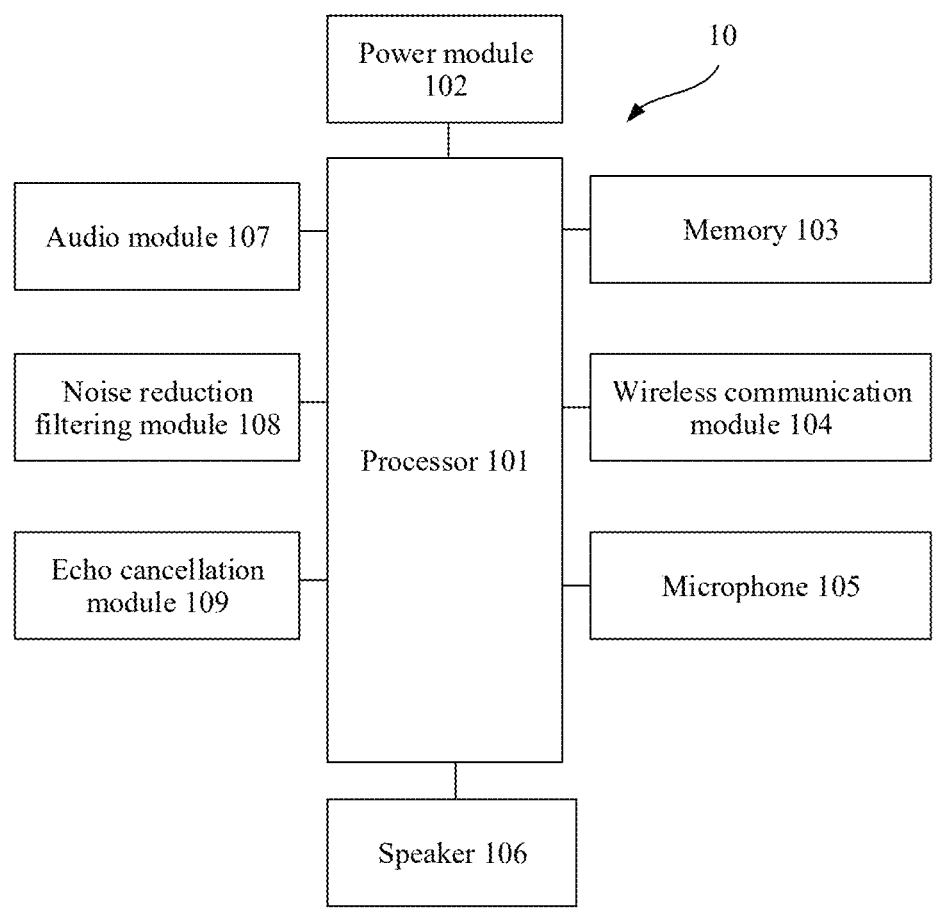
FIG. 2(a) is a schematic diagram of a structure of true wireless stereo earbuds in a use scenario according to an embodiment of the application.

According to an embodiment of the application, the following describes structures of a true wireless stereo (TWS) earbud disclosed in embodiments of the application and an electronic device cooperating with the true wireless stereo earbud. The electronic device includes but is not limited to an electronic device such as a mobile phone, a tablet computer, a laptop computer, a desktop computer, a wearable device, a head-mounted display, a mobile email device, a portable game console, a portable music player, a reader device, a personal digital assistant, a virtual reality or augmented reality device, and a television set in which one or more processors are embedded or that is coupled to one or more processors. FIG. 2(a) is a schematic diagram of a structure of a true wireless stereo earbud in a use scenario according to an embodiment of the application. As shown in FIG. 2(a), the true wireless stereo earbud 10 may include a processor 101, a power module 102, a memory 103, a wireless communication module 104, a microphone 105, a speaker 106, an audio module 107, a noise reduction filtering module 108, an echo cancellation module 109, and the like.

In an embodiment of the application, it may be understood that the structure shown in FIG. 2(a) in an embodiment of the application does not constitute a limitation on the true wireless stereo earbud 10. In some other embodiments of the application, the true wireless stereo earbud 10 may include more or fewer components than those shown in FIG. 2(a), or some components may be combined, or some components may be split, or the components may be disposed differently. The components shown in FIG. 2(a) may be implemented by hardware, software, or a combination of software and hardware.

The power module 102 may include a battery, a battery management component, and the like. The power management component is configured to manage charging of a power supply and supplying power to another module via the power supply. The battery may be a rechargeable battery such as a lithium-ion battery or a lead-acid battery. A shape of the battery may be but is not limited to a button, a square, or the like.

In an embodiment of the application, at least some functional modules of the wireless communication module 104 may be disposed in the processor 101, and at least some functional modules of the wireless communication module 104 and at least some modules of the processor 101 may be disposed in a same device.

In an embodiment of the application, the wireless communication module 104 may provide a wireless communication solution that is applied to the true wireless stereo earbud 10 and that includes a wireless local area network (WLAN) (for example, a wireless fidelity (Wi-Fi) network), Bluetooth (BT), a global navigation satellite system (GNSS), frequency modulation (FM), a near field communication (NFC) technology, and the like. The true wireless stereo earbud 10 may communicate with a network and a mobile phone by using the wireless communication technology. In an embodiment of the application, the wireless communication module 104 may be a Bluetooth chip, and a communication manner is Bluetooth communication. To reduce power consumption of the true wireless stereo earbud 10 caused by the Bluetooth chip, a Bluetooth chip with low power consumption may be used, and a model of the Bluetooth chip with low power consumption may be NRF52810-QFAA-R Bluetooth 5.0.

In an embodiment of the application, the audio module 107 is configured to convert digital audio information into an analog audio signal for output, or convert an analog audio input into a digital audio signal. The audio module 107 may be further configured to encode and decode an audio signal. In an embodiment of the application, the audio module 107 may be disposed in the processor 101, or some functional modules of the audio module 107 are disposed in the processor 101. The audio module 107 includes but is not limited to an analog-to-digital converter, an encoder, a decoder, and the like. The analog-to-digital converter converts an analog audio signal collected by the true wireless stereo earbud 10 into a digital audio signal through analog-to-digital conversion. The encoder compresses an audio signal collected by the true wireless stereo earbud 10, encodes the compressed audio signal, and transmits an encoded audio signal to another corresponding true wireless stereo earbud through Bluetooth or another wireless transmission manner. A decoder disposed in the another true wireless stereo earbud decodes the encoded audio signal, to restore an original audio signal collected by the true wireless stereo earbud 10.

In an embodiment of the application, the speaker 106 is configured to convert an audio signal into a sound signal for output, and the user may listen to music or the like by using the speaker 106. The microphone 105 is configured to convert a collected audio signal into an electrical signal and transmit the electrical signal to the processor 101. The microphone 105 may include an analog microphone and a digital microphone. Correspondingly, audio signals collected by different types of microphones and transmitted to the processor 101 may include an analog signal and a digital signal. In addition, it should be noted that one or a plurality of microphones 105 may be set for a single true wireless stereo earbud 10, that is, each true wireless stereo earbud 10 may collect audio by using one microphone 105 or may collect audio by using a plurality of microphones 105. When the plurality of microphones 105 of each true wireless stereo earbud 10 are used to collect audio, after audio signals collected by the plurality of microphones 105 of each true wireless stereo earbud 10 are subjected to analog-to-digital conversion and encoded by respective audio modules 107, noise reduced and filtered by the noise reduction filtering module 108, and echo cancelled by the echo cancellation module 109, the processor 101 combines a plurality of audio signals collected by the plurality of microphones into one signal, which is used as an audio signal finally output by each true wireless stereo earbud 10.

In an embodiment of the application, the processor 101 may include one or more processing units, for example, may include a processing module or a processing circuit of a central processing unit (CPU), a graphics processing unit (GPU), a digital signal processor (DSP), a microprocessor (MCU), an artificial intelligence (AI) processor, a programmable logic device (Field-Programmable Gate Array, FPGA), or the like. Different processing units may be independent devices, or may be integrated into one or more processors. A storage unit may be disposed in the processor 101, and is configured to store instructions and data. In an embodiment, the storage unit in the processor 101 is a cache. It should be noted that the processor 101 may also be used as a controller.

In an embodiment of the application, the storage unit may include one or more tangible non-transitory computer-readable media configured to store data and/or instructions. In an embodiment, the storage unit may include any suitable non-volatile memory such as a flash memory and/or any suitable non-volatile storage device, for example, at least one of a hard disk drive (HDD), a compact disc (CD) drive, and a digital versatile disc (DVD) drive.

The noise reduction filtering module 108 performs noise reduction and filtering on an audio signal collected by the microphone 105 of the true wireless stereo earbud 10, to improve definition and smoothness of the audio signal. The noise reduction filtering module 108 may be disposed in a processor. The noise reduction filtering module 108 may be a DSP audio processing circuit, and a main control chip in the DSP audio processing circuit may be a TM2320C5x series chip or an ARM system chip. The noise reduction filtering module 108 may perform noise reduction on the audio signal by using a DNN noise reduction algorithm, an ASNR noise reduction algorithm, a beamforming noise reduction algorithm, or the like.

The echo cancellation module 109 cancels an echo in a signal received by the microphone 105 of the true wireless stereo earbud 10. The echo is a phenomenon that a voice that a user sends to another person through a communication device returns to an earpiece of the speaker, and may be eliminated by using a linear elimination method and a nonlinear elimination method. In the nonlinear elimination method, an echo suppression algorithm may be used. For the echo suppression algorithm, a comparator compares a level of a sound to be played by a speaker with a level of a sound currently picked up by the microphone 105. If the level of the sound to be played by the speaker exceeds a threshold, the sound may be transmitted to the speaker, and the microphone 105 is disabled to avoid picking up the sound played by the speaker, so that a remote echo is not formed. If the level of the sound picked up by the microphone 105 exceeds a threshold, the speaker is disabled to cancel the echo. In the linear cancellation method, an acoustic echo cancellation algorithm may be used. For the acoustic echo cancellation algorithm, based on a correlation between a speaker signal and a plurality of echoes generated by the speaker, a voice model of a remote signal is established. The echoes are estimated by using the voice model and coefficients of a filter are continuously modified, so that an echo estimated value is more approximate to a real echo. Then, the echo estimated value is subtracted from an input signal of the microphone 105 to cancel the echo. For a technology related to echo cancellation, refer to the conventional technology. This is not specifically limited in an embodiment of the present disclosure.

According to an embodiment of the application, the following describes, by using an example in which the electronic device is a mobile phone 20, the technical solution of a recording system in which a recording function is implemented by cooperating with the true wireless stereo earbud 10 in an embodiment of the application. First, it should be noted that the electronic device that is provided according to an embodiment of the application and that is configured to cooperate with the true wireless stereo earbud 10 to perform recording may be not limited to a mobile phone, or may be an electronic device including but not limited to a tablet computer, a laptop computer, a desktop computer, a wearable device, a head-mounted display, a mobile email device, a portable game console, a portable music player, a reader device, a personal digital assistant, a virtual reality or augmented reality device, and a television set in which one or more processors are embedded or that is coupled to one or more processors.

The following describes the technical solution of the application by using a mobile phone 20 as an example according to an embodiment of the application.

Figure 3A:
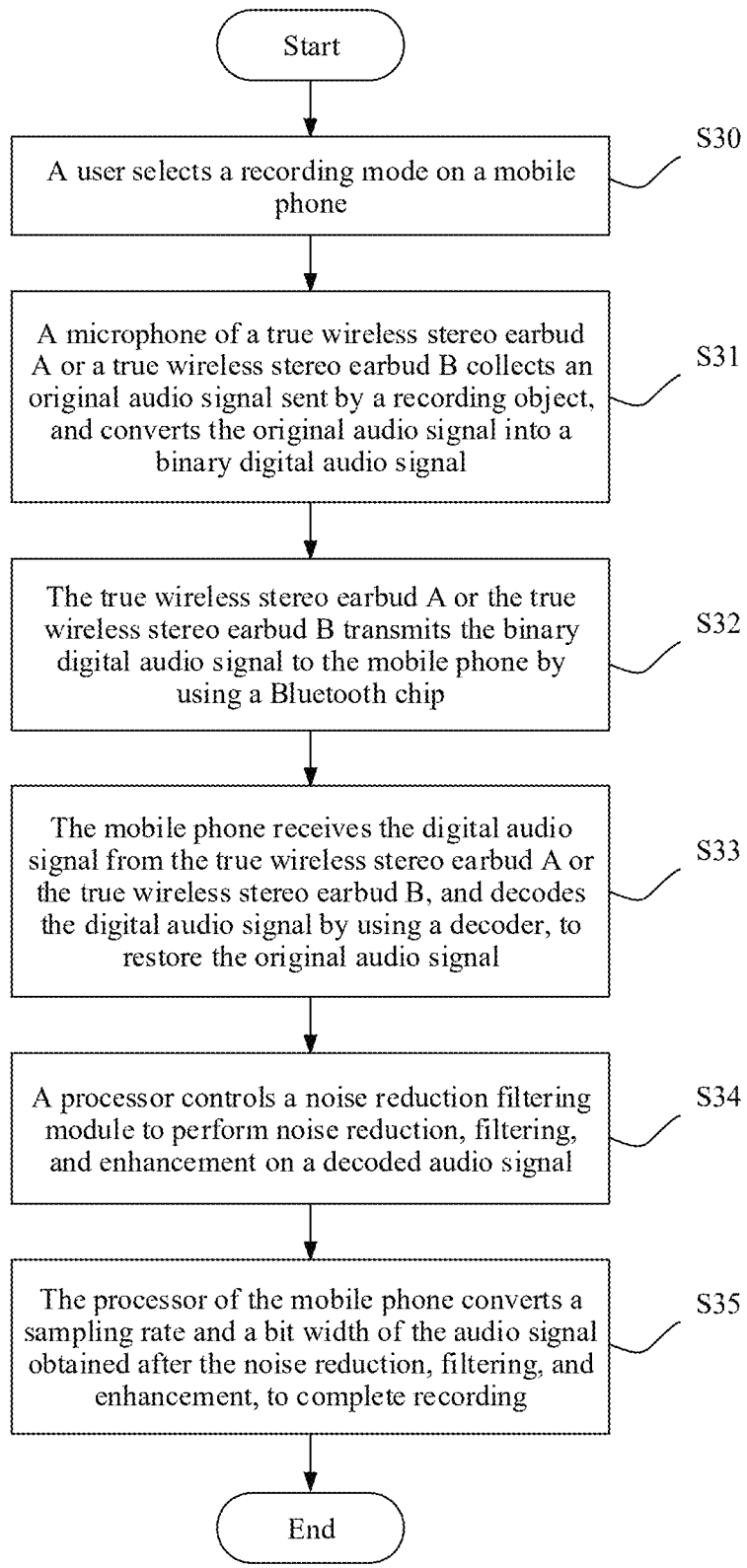
FIG. 3(a) is a schematic flowchart of a single-earbud recording method according to an embodiment of the application.
Figures 1, 2, 3B:
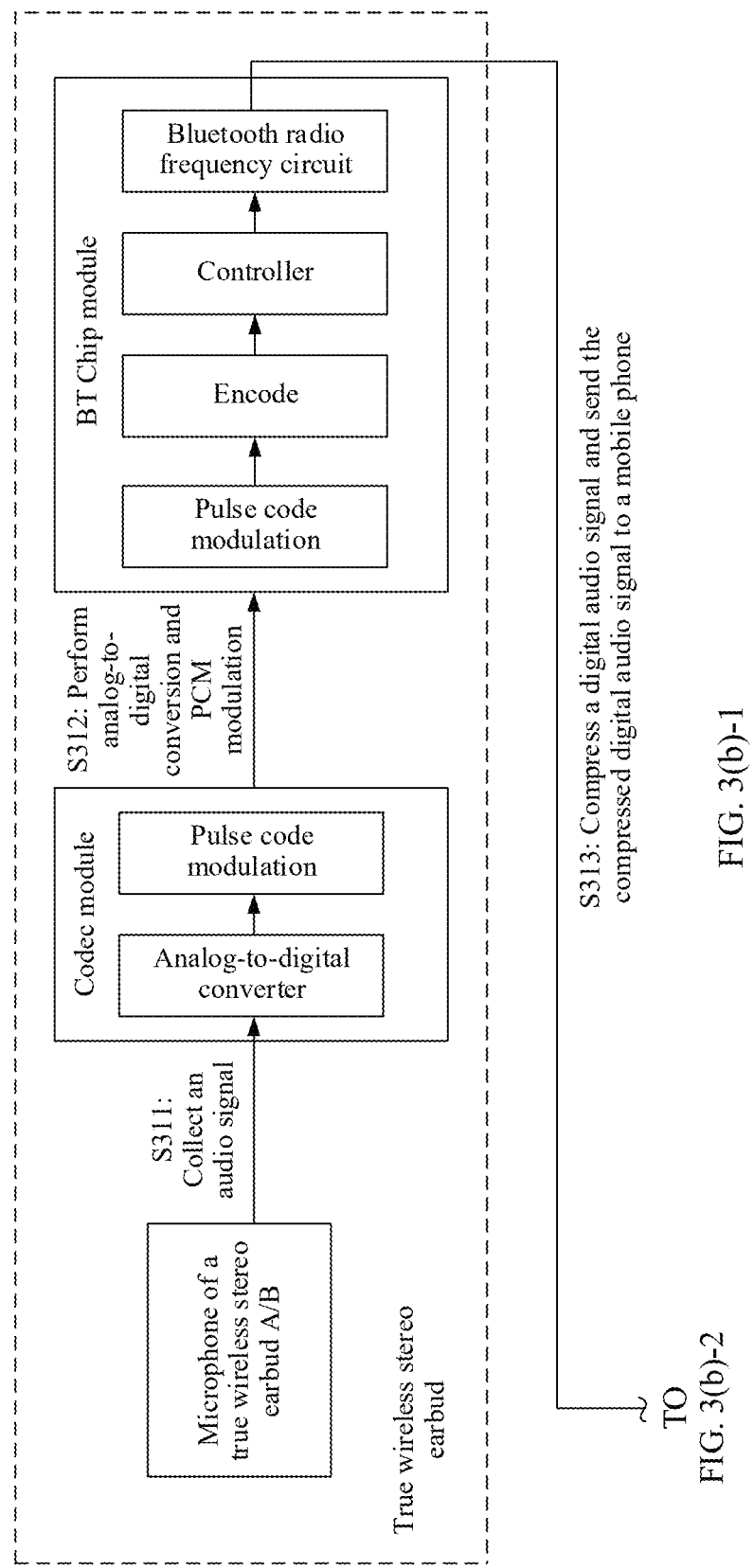
Figures 2, 3B:
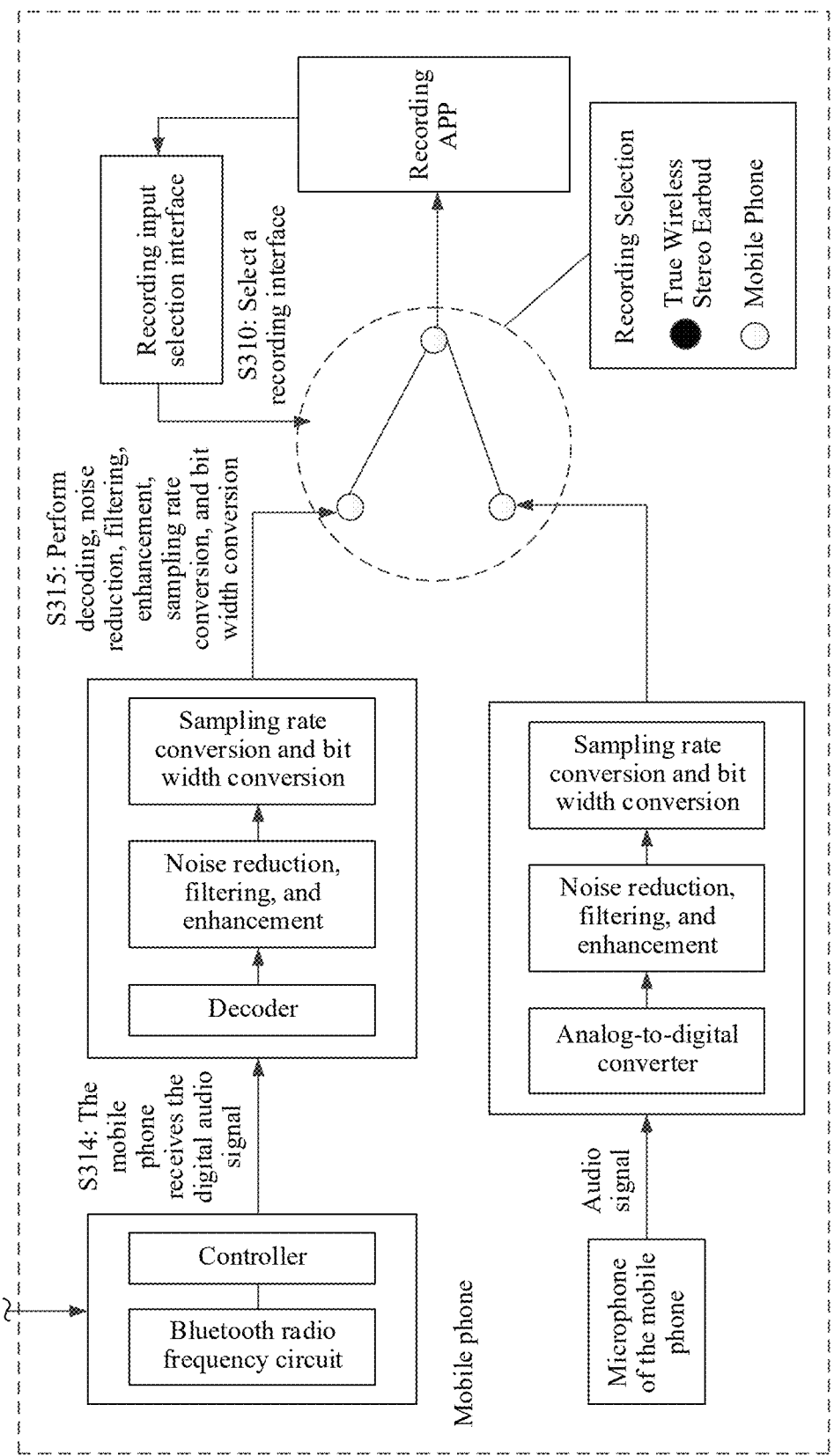

As shown in FIG. 2(*b*), the mobile phone 20 may include a processor 210, a power supply 220, a memory 230, a mobile communication module 240, a wireless communication module 250, an audio module 260, a display 270, a noise reduction filtering module 280, an echo cancellation module 290, and the like.

It may be understood that the structure shown in an embodiment of the present disclosure does not constitute a limitation on the mobile phone 20. In some other embodiments of the application, the mobile phone 20 may include more or fewer components than those shown in the figure, or some components may be combined, or some components may be split, or the components may be disposed differently. The components shown in the figure may be implemented by hardware, software, or a combination of software and hardware.

The processor 210 may include one or more processing units, for example, may include a processing module or processing circuit of a central processing unit (CPU), a graphics processing unit (GPU), a digital signal processor (DSP), a microprocessor MCU (Micro-programmed Control Unit), an artificial intelligence (AI) processor, a programmable logic device (Field-Programmable Gate Array, FPGA), or the like. Different processing units may be independent devices, or may be integrated into one or more processors. A storage unit may be disposed in the processor 210, and is configured to store instructions and data. In an embodiment, the storage unit in the processor 210 is a cache.

The power module 220 may include a power supply, a power management component, and the like. The power management component is configured to manage charging of the power supply and supplying power to another module by the power supply.

The mobile communication module 240 may include but is not limited to an antenna, a power amplifier, a filter, a low noise amplifier (LNA), and the like. The mobile communication module 240 may provide a wireless communication solution that is applied to the mobile phone 20 and that includes 2G, 3G, 4G, 5G, or the like. The mobile communication module 240 may receive an electromagnetic wave by using the antenna, perform processing such as filtering and amplification on the received electromagnetic wave, and transmit a processed electromagnetic wave to a modem processor for demodulation. The mobile communication module 240 may further amplify a signal modulated by the modem processor, and convert an amplified signal into an electromagnetic wave for radiation by using the antenna. In an embodiment, at least some functional modules of the mobile communication module 240 may be disposed in the processor 210. In an embodiment, at least some functional modules of the mobile communication module 240 and at least some modules of the processor 210 may be disposed in a same device. A wireless communication technology may include a global system for mobile communications (GSM), a general packet radio service (GPRS), code division multiple access (CDMA), wideband code division multiple access (WCDMA), time-division code division multiple access (TD-CDMA), long term evolution (LTE), BT (Bluetooth), GNSS (Global Navigation Satellite System), WLAN (Wireless Local Area Network), NFC (Near Field Communication), FM (Frequency Modulation), IR (Infrared) technology, and/or the like. The GNSS may include a global positioning system (GPS), a global navigation satellite system (GNSS), a BeiDou navigation satellite system (BDS), a quasi-zenith satellite system (QZSS), and/or a satellite based augmentation system (SBAS).

The wireless communication module 250 may include an antenna, and receive and send an audio signal by using the antenna. The wireless communication module 250 may provide a wireless communication solution that is applied to the mobile phone 20 and that includes a wireless local area network (WLAN) (for example, a wireless fidelity (wireless fidelity, Wi-Fi) network), Bluetooth (BT), a global navigation satellite system (GNSS), frequency modulation (FM), a near field communication (NFC) technology, and the like. The mobile phone 20 may communicate with a network and the true wireless stereo earbud 10 by using the wireless communication technology.

In an embodiment, the mobile communication module 240 and the wireless communication module 250 that are of the mobile phone 20 may be alternatively disposed in a same module.

The display 270 is configured to display a man-machine interaction interface, an image, a video, and the like. The display 270 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), and the like.

The audio module 260 is configured to convert a digital audio signal into an analog audio signal and output the analog audio signal by using a speaker of the mobile phone, or input an analog audio signal collected by a microphone and convert the analog audio signal into a digital audio signal. The audio module 260 may be further configured to encode and decode an audio signal. In an embodiment, the audio module 260 may be disposed in the processor 210, or some functional modules of the audio module 260 are disposed in the processor 210.

Figure 2B:
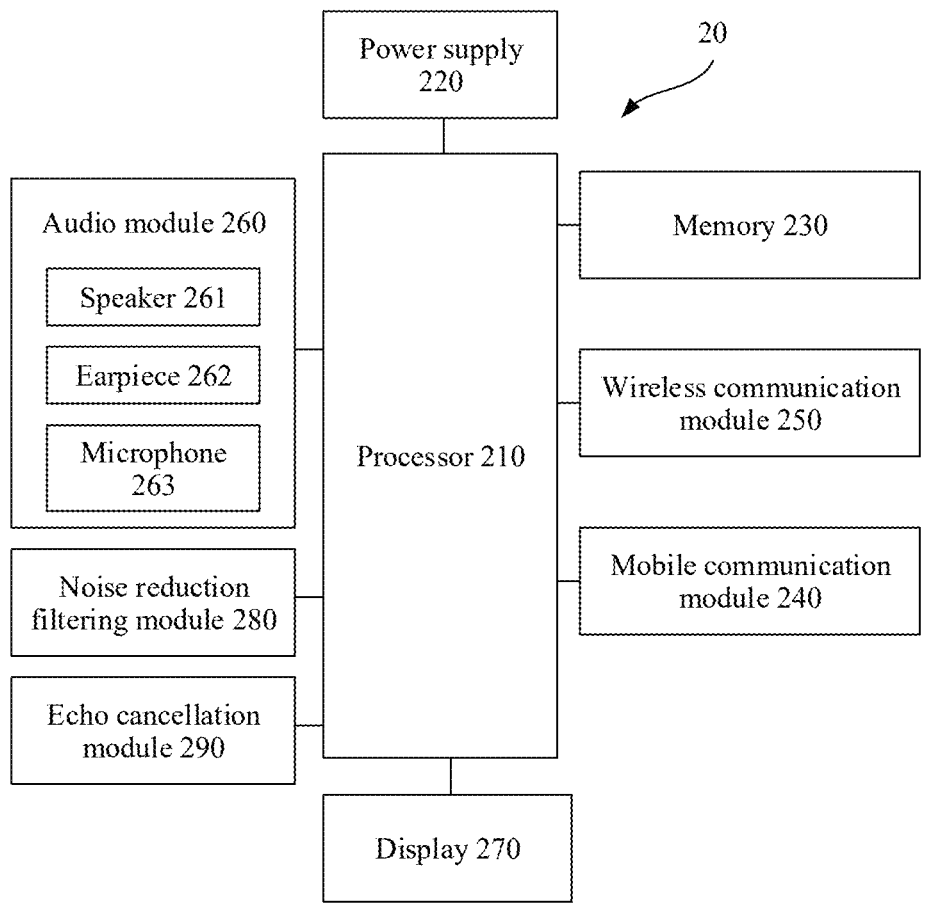
FIG. 2(b) is a schematic diagram of a structure of a mobile phone in a use scenario according to an embodiment of the application.

As shown in FIG. 2(b), the audio module 260 may include but is not limited to a speaker 261, an earpiece 262, and a microphone 263. The speaker 261 is configured to convert the audio signal into a sound signal, and then output the sound signal. The mobile phone 20 may listen to music or answer a hands-free call by using the speaker 261. The earpiece 262, also referred to as a "receiver", is configured to convert an audio electrical signal into a sound signal, and then output the sound signal. When a user answers a call, makes a network voice call, or outputs voice information by using the mobile phone 20, the user may listen to a voice by holding the earpiece 262 to an ear. The microphone 263 is configured to convert a collected sound signal into an electrical signal. In an embodiment, the microphone 263 may include a primary microphone and a secondary microphone. The primary microphone is disposed at the bottom of the mobile phone 20, and the secondary microphone is disposed at the top of the mobile phone 20.

The noise reduction filtering module 280 performs noise reduction and filtering on an audio signal collected by a microphone of the mobile phone 20, to improve definition and smoothness of the audio signal. The noise reduction filtering module 280 may be disposed in a processor. The noise reduction filtering module 280 may be a DSP audio processing circuit, and a main control chip in the DSP audio processing circuit may be a TM2320C5x series chip or an ARM system chip. The noise reduction filtering module 108 may perform noise reduction on the audio signal by using a DNN noise reduction algorithm, an ASNR noise reduction algorithm, a beamforming noise reduction algorithm, or the like.

Figure 2C:
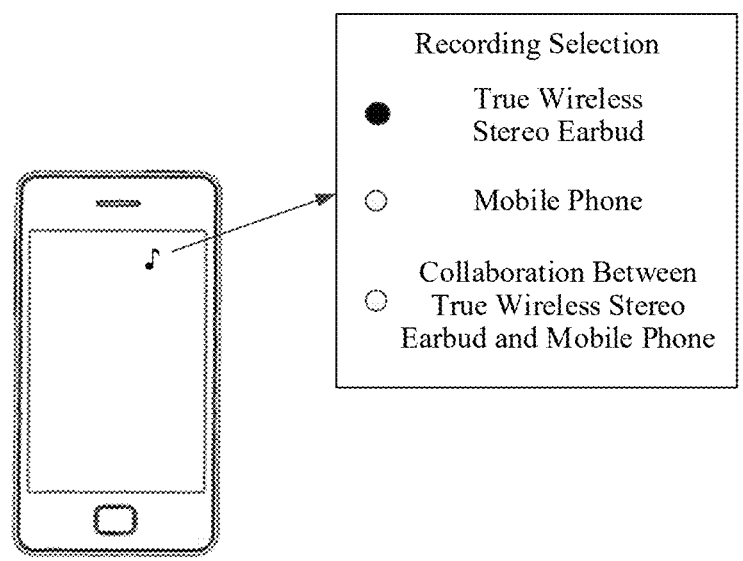
FIG. 2(c) is a schematic diagram of recording selection according to an embodiment of the application.

In an embodiment of the application, in a recording system formed by the true wireless stereo earbud shown in FIG. 2(a) and the mobile phone shown in FIG. 2(b) in an embodiment of the application, a user may shoot a mini video, broadcast online, sing karaoke, and the like by using the mobile phone and the true wireless stereo earbud. In addition, the user may check, by using a corresponding audio recording APP, whether the mobile phone supports recording by the true wireless stereo earbud, and may control an audio signal from the true wireless stereo earbud or an audio signal from the mobile phone to be input into the audio recording APP. The user opens a "Recording Selection" window by using a "Recording Selection" icon displayed on a video/audio recording graphical user interface of the mobile phone 20. As shown in FIG. 2(c), the "Recording Selection" window displays three recording modes: "True Wireless Stereo Earbud", "Mobile Phone", and "Collaboration Between True Wireless Stereo Earbud and Mobile Phone". After the user taps and selects "True Wireless Stereo Earbud", recording is implemented by using the true wireless stereo earbud 10. A recording process is as follows: A microphone of one or two true wireless stereo earbuds 10 collects an analog audio signal sent by a recording object, and then converts the analog audio signal into a digital audio signal by using the analog-to-digital converter. The noise reduction filtering module 108 and the echo cancellation module 109 in the true wireless stereo earbud 10 respectively perform noise cancellation and echo cancellation on the digital audio signal, to obtain a definite audio signal that does not include noise. An encoder in the true wireless stereo earbud 10 compresses and encodes the digital audio signal, and then the wireless communication module 104 in the true wireless stereo earbud 10 sends a compressed and encoded digital audio signal to the mobile phone 20. The wireless communication module 250 of the mobile phone 20 receives the digital audio signal transmitted by the true wireless stereo earbud 10, and a decoder in the mobile phone 20 decodes and restores the digital audio signal to an original audio signal. The noise reduction filtering module 280 and the echo cancellation module 290 of the mobile phone 10 perform further noise reduction and echo preprocessing on the restored original audio signal, to further improve definition of the audio signal. In this way, the true wireless stereo earbud 10 completes recording.

The following describes in detail the recording process of the true wireless stereo earbud 10. It should be noted that the following embodiments of the application do not constitute a limitation on the recording method of true wireless stereo earbud.

In an embodiment of the application, a recording method of true wireless stereo earbuds is disclosed. In the recording method, there may be three modes of single-earbud recording, dual-earbud recording, and collaborative recording by using a mobile phone and a true wireless stereo earbud. An audio signal collected by the true wireless stereo earbud or an audio signal collected through collaborative recording by using the mobile phone and the true wireless stereo earbud may be played by using the speaker 261 of the mobile phone 20, or may be played back by using the speaker 106 of the true wireless stereo earbud 10. The following separately describes the foregoing recording modes in detail.

Embodiment 1

Figures 1, 6A:
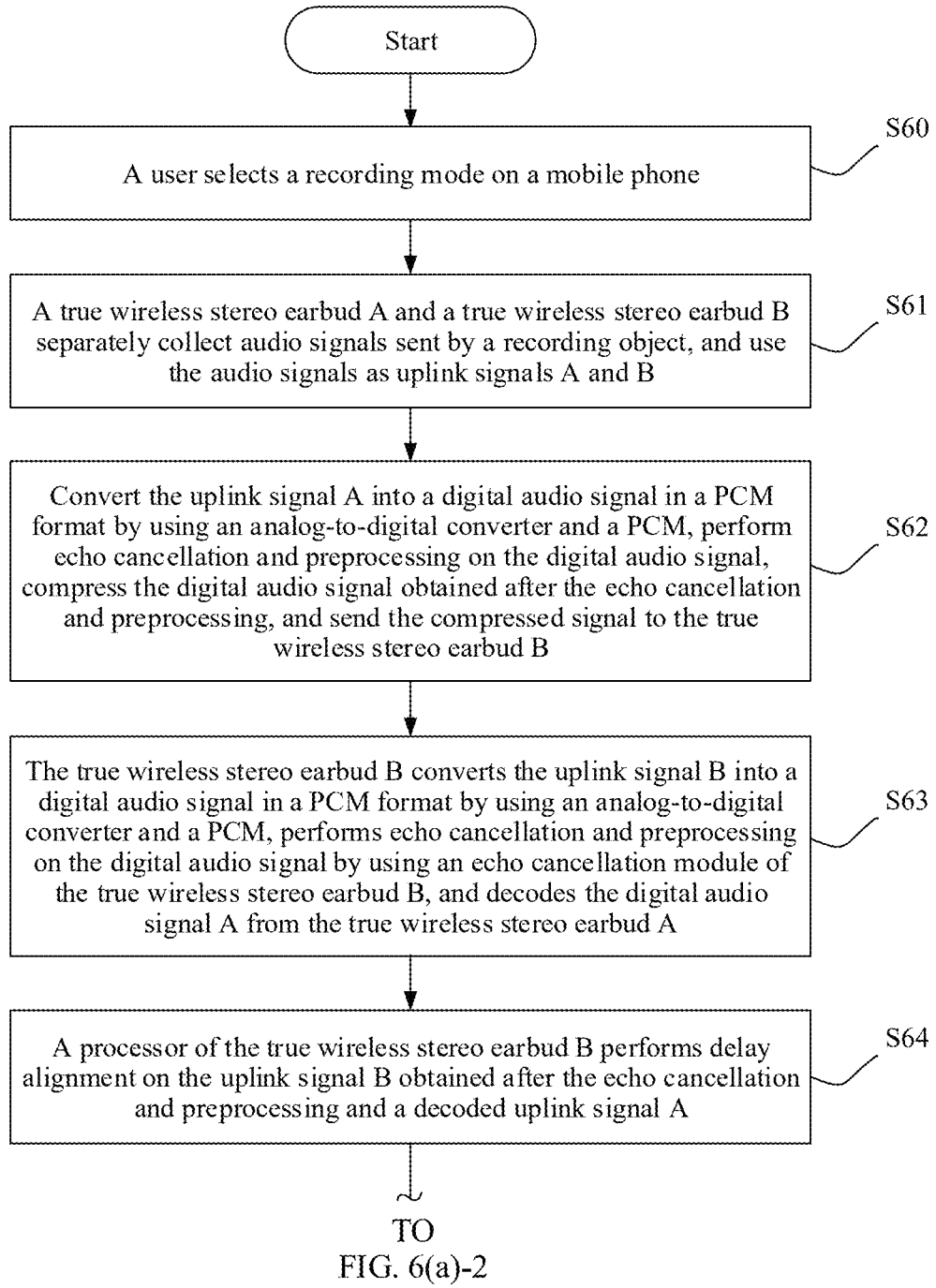
Figures 1, 6B:
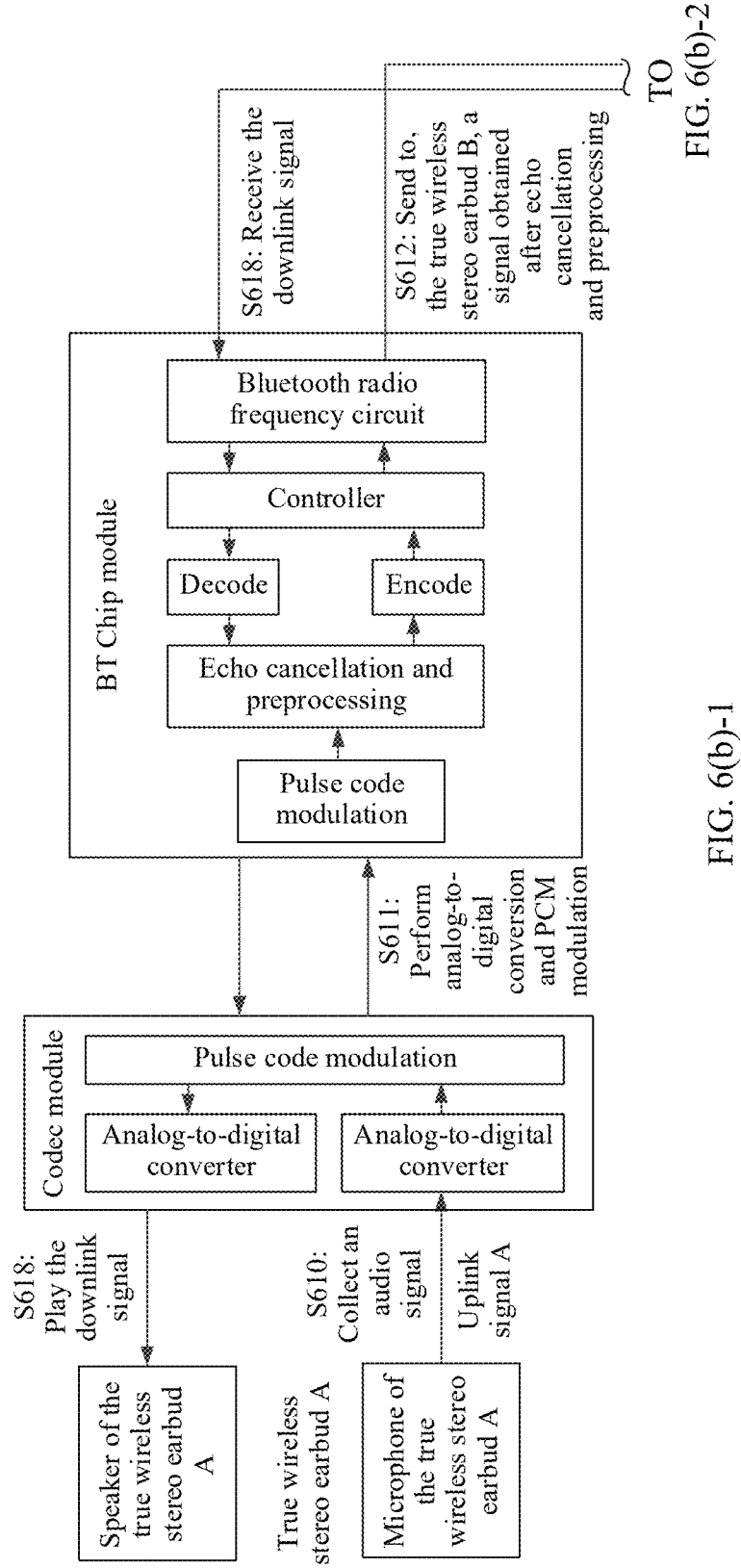
Figures 2, 6B:
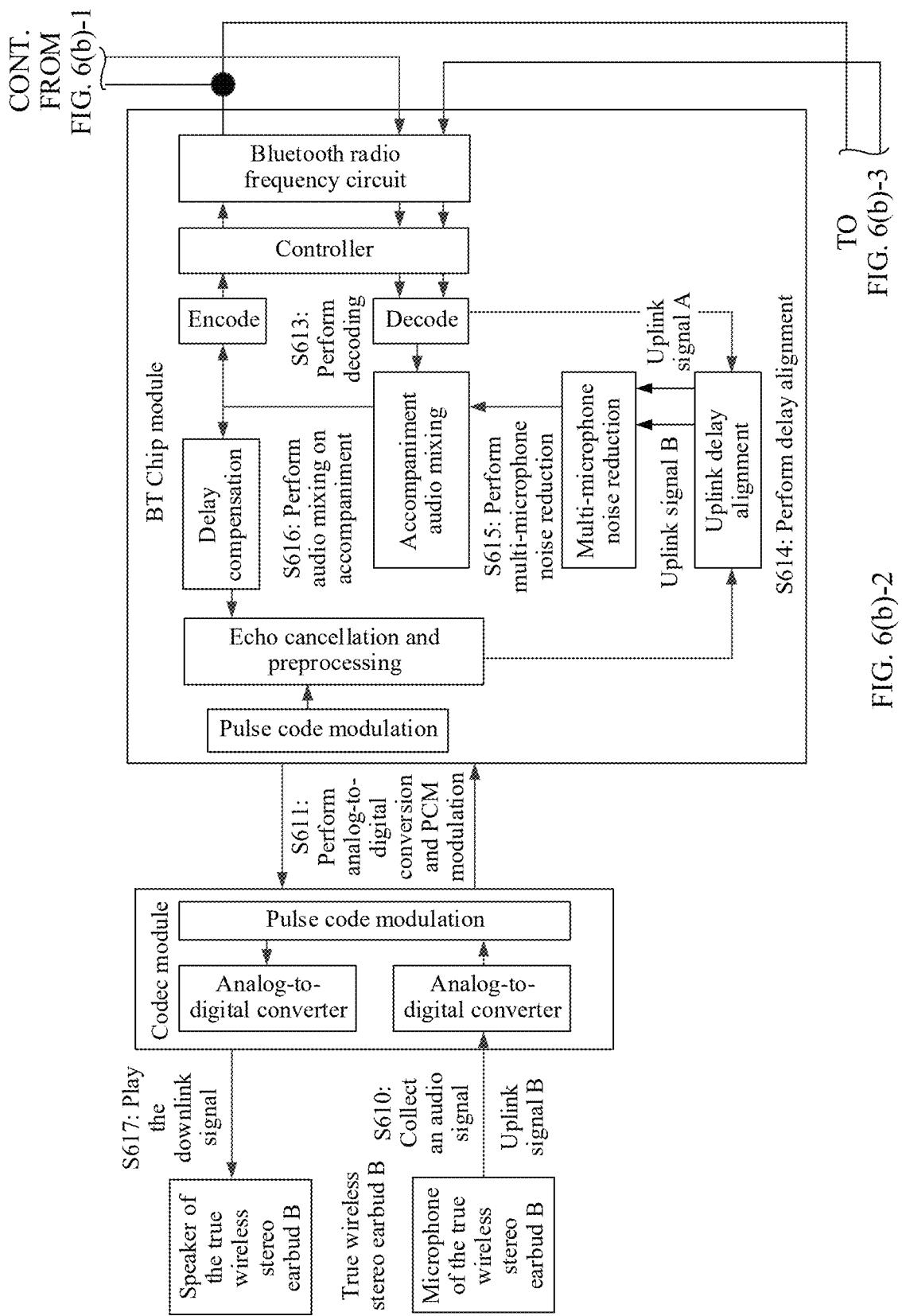
Figures 3, 6B:
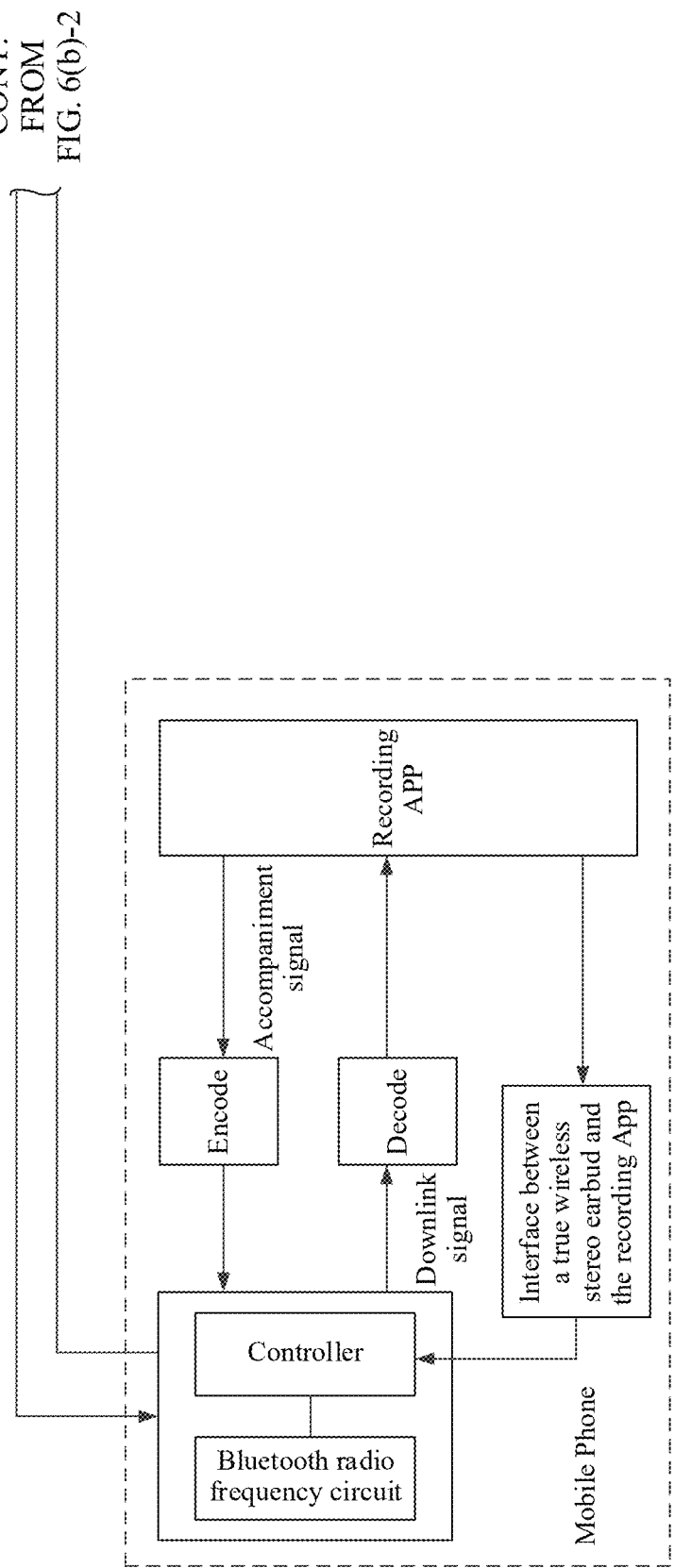

Refer to FIG. 3(*a*), FIG. 3(*b*)-1, and FIG. 3(*b*)-2. FIG. 3(*a*) is a schematic flowchart of a single-earbud recording method according to an embodiment of the application. FIG. 3(*b*)-1 and FIG. 3(*b*)-2 are a thread diagram of a method for implementing the single-earbud recording method according to an embodiment of the application.

As shown in FIG. 3(*a*), the single-earbud recording method includes the following operations.

Operation S30: A user selects a recording mode on a mobile phone. The user opens a "Recording Selection" window by using a "Recording Selection" icon displayed on a video/audio recording graphical user interface on a display of the mobile phone. As shown in FIG. 2(*c*), the "Recording Selection" window displays three recording modes: "True Wireless Stereo Earbud", "Mobile Phone", and "Collaboration Between True Wireless Stereo Earbud and Mobile Phone". After the user taps and selects "True Wireless Stereo Earbud", recording is implemented by using a true wireless stereo earbud 10. In an embodiment of the application, an example in which the user selects a mode of recording by a true wireless stereo earbud is used for description. For a mode of recording by using a microphone of the mobile phone, refer to the conventional technology. Details are not described herein in an embodiment of the application.

Operation S31: A microphone of a true wireless stereo earbud A (a first true wireless stereo earbud) or a true wireless stereo earbud B (a second true wireless stereo earbud) collects an original audio signal sent by a recording object, and converts the original audio signal into a digital audio signal. The recording object may be the user. The original audio signal may be a human voice signal sent by the user. The true wireless stereo earbud A may be a left true wireless stereo earbud, and the true wireless stereo earbud B may be a right true wireless stereo earbud. Alternatively, the true wireless stereo earbud A is a right true wireless stereo earbud, and the true wireless stereo earbud B is a left true wireless stereo earbud. An audio signal collected by the microphone of the true wireless stereo earbud A or the true wireless stereo earbud B may be an analog signal or a digital signal. If the audio signal collected by the microphone of the true wireless stereo earbud A is an analog audio signal, the analog signal collected by the true wireless stereo earbud A is converted into the digital signal by using an analog-to-digital converter in an audio module of the true wireless stereo earbud A. If the audio signal collected by the microphone of the true wireless stereo earbud B is the analog audio signal, the analog signal collected by the true wireless stereo earbud B is converted into the digital signal by using an analog-to-digital converter in an audio module of the true wireless stereo earbud B. Operation S32 is performed. If the audio signal collected by the microphone of the true wireless stereo earbud A or the true wireless stereo earbud B is the digital audio signal, pulse code modulation (PCM) may be performed on the digital audio signal by using an encoder in the audio module of the true wireless stereo earbud A or the true wireless stereo earbud B, so that encoding of the digital audio signal is completed, to obtain the digital audio signal. It should be noted that a priority may be preset for which of two true wireless stereo earbuds is used to collect the audio signal. For example, a priority of the true wireless stereo earbud B is set to be higher than that of the true wireless stereo earbud A. When the single-earbud recording method is applied, the true wireless stereo earbud B may be preferentially used for recording.

Operation S32: The true wireless stereo earbud A or the true wireless stereo earbud B transmits the digital audio signal to the mobile phone by using a Bluetooth chip. When the digital audio signal is transmitted through a Bluetooth radio frequency circuit in the Bluetooth chip, the digital audio signal may be compressed, to reduce bandwidth occupied during Bluetooth transmission.

Operation S33: The mobile phone receives the digital audio signal from the true wireless stereo earbud A or the true wireless stereo earbud B through Bluetooth communication, and decompresses and decodes the digital audio signal by using a decoder in an audio module of the mobile phone, to restore the original audio signal.

Operation S34: The decoder in the mobile phone transmits a decoded audio signal to a processor. The processor controls a noise reduction filtering module to perform noise reduction, filtering, and enhancement on the decoded audio signal. For example, the noise reduction filtering module performs noise reduction and filtering on wind noise and another ambient noise included in the decoded audio signal, and enhances a target audio signal (for example, a human voice) in the audio signal, to improve definition and a signal-to-noise ratio of the human voice.

Operation S35: The processor of the mobile phone converts a sampling rate and a bit width of the audio signal obtained after the noise reduction, filtering, and enhancement, to complete recording. The sampling rate and the bit width of the audio signal are converted into a sampling rate and a bit width that are compatible with a system of the mobile phone. For example, a sampling rate of the audio signal is 44.1 kHz, a bit width is 24 bits, and a sampling rate and a bit width that are compatible with the system of the mobile phone are respectively 48 kHz and 16 bits. To make the sampling rate and the bit width of the audio signal compatible with the system of the mobile phone, the processor converts a 44.1 kHz/24-bit audio signal into a 48 kHz/16-bit audio signal, so that the audio signal is compatible with the system of the mobile phone. When the audio signal is played, to enable both earbuds to play the audio signal, the processor of the mobile phone may convert a converted single-channel audio signal into dual-channel audio signals, and the conversion of the single audio signal into the two audio signals may be implemented through copying. Because the audio signal of the user is collected by a single earbud, the audio signal transmitted to the mobile phone is a single-channel audio signal. Before the single-channel audio signal is stored, the single-channel audio signal is converted into dual-channel audio signals. In this way, when audio is played, the audio can be played from the two channels, so that user experience is improved.

FIG. 3(b)-1 and FIG. 3(b)-2 are a signal flow diagram of the single-earbud recording method according to an embodiment of the application. An example in which the true wireless stereo earbud B performs recording and the microphone is an analog microphone is used for description.

When the user opens an application to record audio, the user selects a recording input selection interface by using the "Recording Selection" icon popped up on a display page of the mobile phone (as shown in S310). When the true wireless stereo earbud is selected as a recording interface, the true wireless stereo earbud is used for recording. When the mobile phone is selected as a recording interface, the microphone of the mobile phone is used for audio recording. For a technology of performing audio recording by using the microphone of the mobile phone, refer to the conventional technology. This is not described herein in an embodiment of the application.

The microphone of the true wireless stereo earbud B collects the original audio signal sent by the recording object, and sends the original audio signal to a codec module, as shown in S311.

The codec module of the true wireless stereo earbud B receives the original audio signal collected by the microphone of the true wireless stereo earbud B. As shown in S312, an analog-to-digital converter and a PCM in the codec module convert and encode the audio signal into the digital audio signal. For example, the analog-to-digital converter in the codec module converts the original audio signal from the analog signal into the digital audio signal. The analog-to-digital converter sends the digital audio signal to the PCM. The PCM encodes and modulates the digital audio signal into a digital audio signal in a PCM format.

The PCM in the true wireless stereo earbud B sends the digital audio signal to a PCM in a BT Chip module by using an inter-integrated circuit sound (Inter-IC Sound, I2S) bus. The I2S bus in the PCM receives the digital audio signal in a PCM format from the codec module. The PCM in the BT Chip module sends the digital audio signal in a PCM format to an encoder in the BT Chip module. The encoder in the BT Chip module encodes the digital signal and transmits an encoded digital signal to the processor of the true wireless stereo earbud B. The processor sends the encoded digital audio signal to a Bluetooth radio frequency circuit. The Bluetooth radio frequency circuit compresses the digital audio signal and transmits the compressed digital audio signal to the mobile phone, as shown in S313. It should be noted that the digital audio signal transmitted by the codec module to the BT Chip module may also be transmitted in another format, which is not limited in an embodiment of the present disclosure.

The processor of the mobile phone controls a Bluetooth module to receive the digital audio signal from the true wireless stereo earbud B, as shown in S314.

The processor sends the digital audio signal received from the true wireless stereo earbud B to the decoder in the mobile phone. The decoder decodes the digital audio signal, and sends a decoded digital audio signal to a noise reduction filtering module. The noise reduction filtering module performs noise reduction, filtering, and enhancement on the decoded audio signal, and enhances a target audio signal (for example, the human voice) in the digital audio signal. Then, the decoded digital signal is sent to a sampling rate and bit width conversion module, and a sampling rate and a bit width that are of the decoded digital signal are converted into a sampling rate and a bit width that are compatible with a system of a mobile phone, and are used and stored by a recording APP, as shown in S315.

According to the recording method of true wireless stereo earbuds disclosed in an embodiment of the application, when recording is performed by using the true wireless stereo earbud, because the true wireless stereo earbud is wireless, an activity area of the user is not limited. In addition, the true wireless stereo earbud has a relatively small size and is more convenient for the user to carry. In addition, in an embodiment of the application, when the true wireless stereo earbud performs recording by using the single earbud, a data amount of the true wireless stereo earbud is relatively small. Therefore, when the mobile phone receives, through Bluetooth, data sent by the true wireless stereo earbud, excessive occupation of Bluetooth bandwidth of the mobile terminal is avoided, and power consumption of the mobile phone is reduced.

Embodiment 2

Figure 4A:
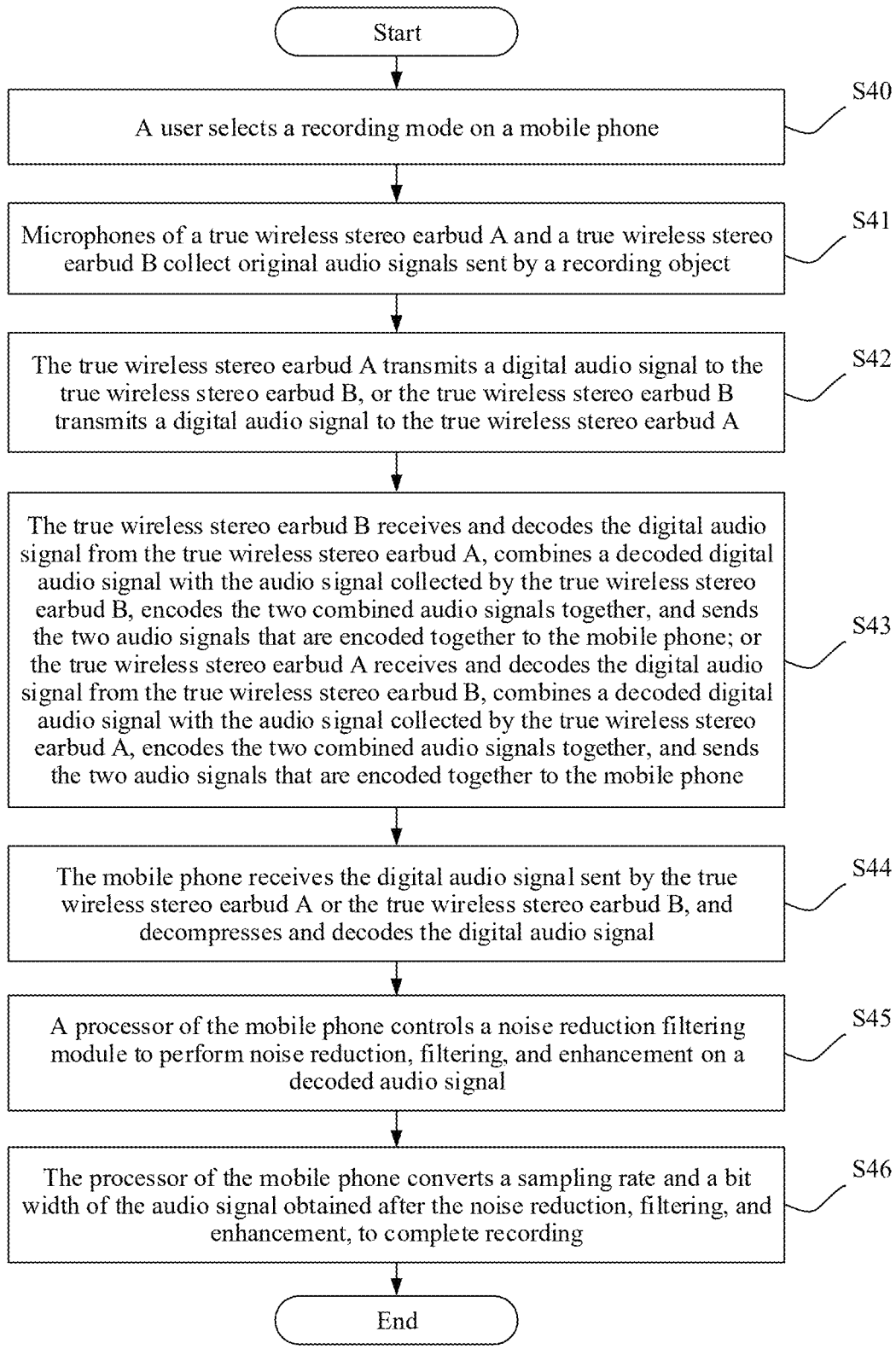
FIG. 4(a) is a schematic flowchart of a dual-earbud recording method according to an embodiment of the application.
Figures 1, 2, 4B:
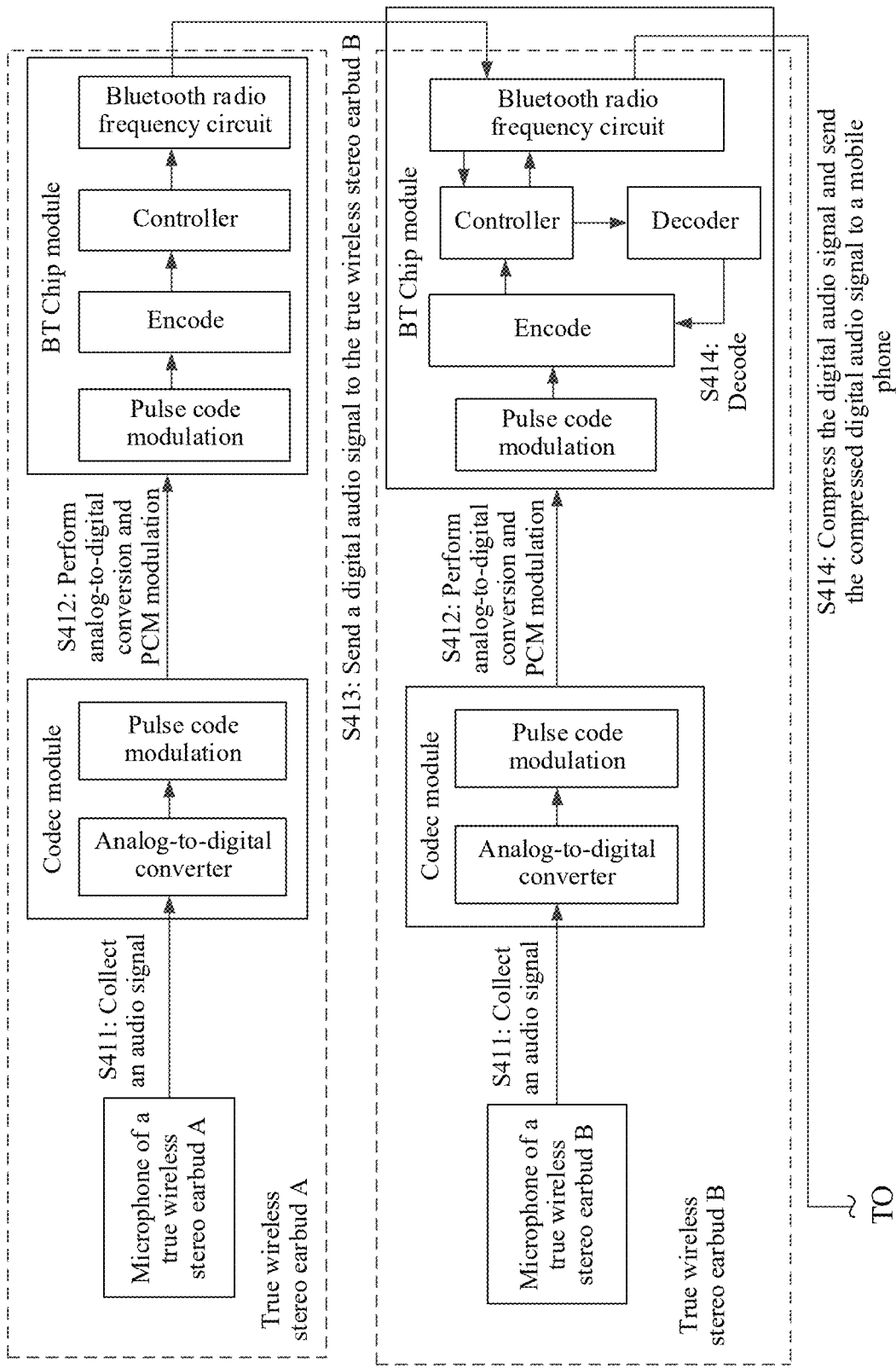
Figures 2, 4B:
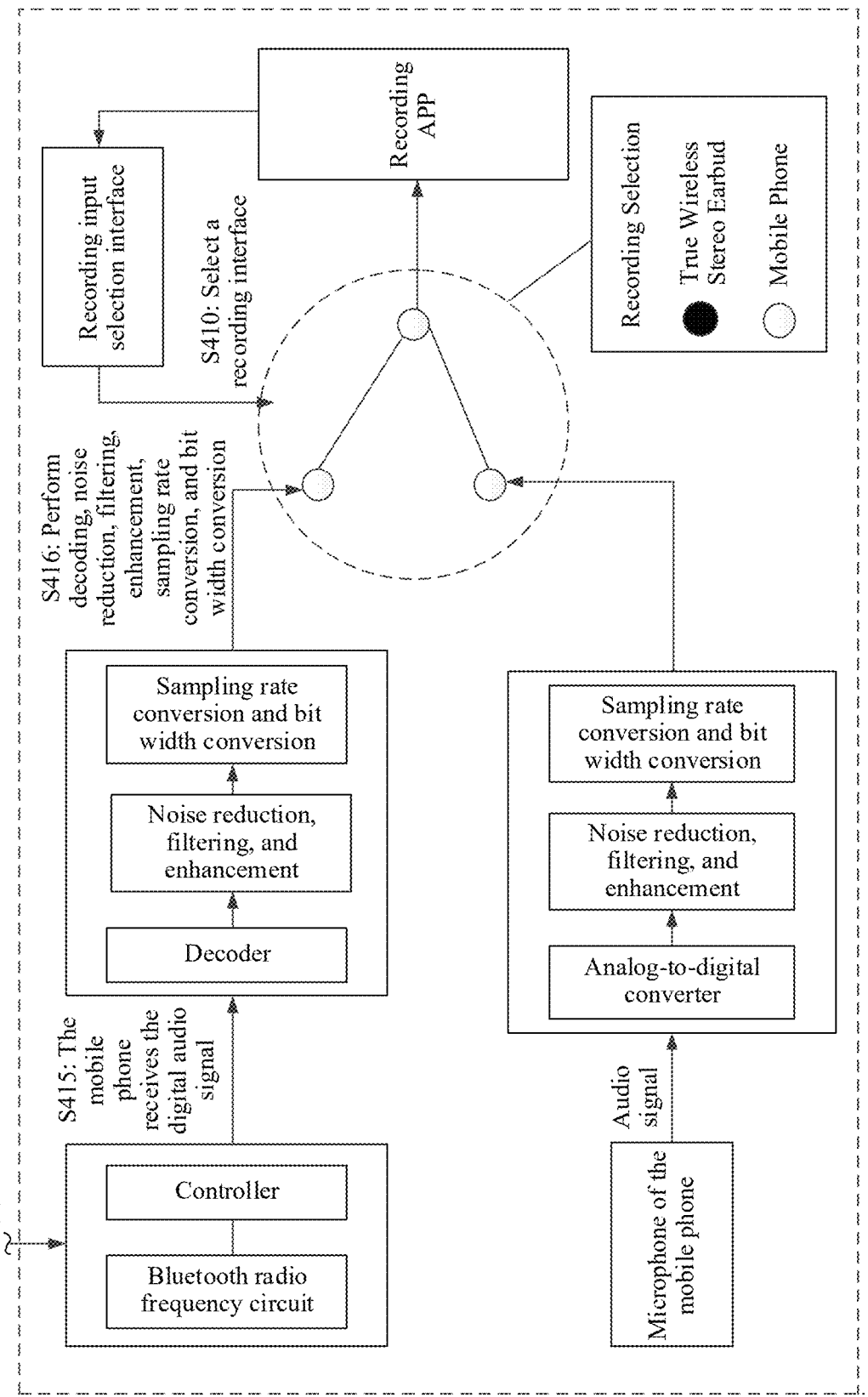

Refer to FIG. 4(a), FIG. 4(b)-1, and FIG. 4(b)-2. FIG. 4(a) is a schematic flowchart of a dual-earbud recording method according to an embodiment of the application. FIG. 4(b)-1 and FIG. 4(b)-2 are a schematic thread diagram of the dual-earbud recording method according to an embodiment of the application.

Operation S40: A user selects a recording mode on a mobile phone. The user opens a "Recording Selection" window by using a "Recording Selection" icon displayed on a video/audio recording graphical user interface on a display of the mobile phone. As shown in FIG. 2(c), the "Recording Selection" window displays three recording modes: "True Wireless Stereo Earbud", "Mobile Phone", and "Collaboration Between True Wireless Stereo Earbud and Mobile Phone". After the user taps and selects "True Wireless Stereo Earbud", recording is implemented by using a true wireless stereo earbud 10. In an embodiment of the application, an example in which the user selects a mode of recording by a true wireless stereo earbud is used for description. For a mode of recording by using a microphone of the mobile phone, refer to the conventional technology. Details are not described herein in an embodiment of the application.

Operation S41: Microphones of a true wireless stereo earbud A (a first true wireless stereo earbud) and a true wireless stereo earbud B (a second true wireless stereo earbud) collect original audio signals sent by a recording object. The recording object may be the user. An original audio signal may be a human voice signal sent by the user. An audio signal collected by the microphone of the true wireless stereo earbud A or the true wireless stereo earbud B may be an analog signal or a digital signal. If the audio signal collected by the microphone of the true wireless stereo earbud A or the true wireless stereo earbud B is an analog audio signal, the analog signal collected by a corresponding true wireless stereo earbud is converted into the digital signal by using analog-to-digital converters in audio modules of the true wireless stereo earbud A and the true wireless stereo earbud B. If the audio signal collected by the microphone of the true wireless stereo earbud A or the true wireless stereo earbud B is a digital audio signal, pulse code modulation (PCM) may be performed on the digital audio signal by using an encoder in an audio module of the true wireless stereo earbud A or the true wireless stereo earbud B, so that encoding of the digital audio signal is completed, to obtain a digital audio signal in a PCM format.

Operation S42: The true wireless stereo earbud A transmits a digital audio signal converted by the true wireless stereo earbud A to the true wireless stereo earbud B by using a Bluetooth chip, or the true wireless stereo earbud B transmits a converted digital audio signal to the true wireless stereo earbud A by using a Bluetooth chip. When the digital audio signal is transmitted through a Bluetooth radio frequency circuit in the Bluetooth chip, the digital audio signal may be compressed, to reduce bandwidth occupied by Bluetooth transmission.

Operation S43: The Bluetooth chip of the true wireless stereo earbud B receives the digital audio signal from the true wireless stereo earbud A. A processor of the true wireless stereo earbud B controls a decoder to decode the digital audio signal from the true wireless stereo earbud A, and combines a decoded digital audio signal with the audio signal collected by the true wireless stereo earbud B. After the two audio signals are combined, the true wireless stereo earbud B encodes the two audio signals together. The processor controls a Bluetooth radio frequency circuit in a Bluetooth chip of the true wireless stereo earbud B to compress the audio signals that are encoded together, and transmit the compressed audio signals to the mobile phone. Alternatively, the Bluetooth chip of the true wireless stereo earbud A receives the digital audio signal from the true wireless stereo earbud B. A processor of the true wireless stereo earbud A controls a decoder to decode the digital audio signal from the true wireless stereo earbud B, and combines a decoded digital audio signal with the audio signal collected by the true wireless stereo earbud A. After the two audio signals are combined, the true wireless stereo earbud A encodes the two audio signals together. The processor controls a Bluetooth radio frequency circuit in a Bluetooth chip of the true wireless stereo earbud A to compress the audio signals that are encoded together, and transmit the compressed audio signals to the mobile phone.

Operation S44: A wireless communication module of the mobile phone receives the digital audio signal from the true wireless stereo earbud A or the true wireless stereo earbud B through Bluetooth communication. A decoder in an audio module of the mobile phone decompresses and decodes the digital audio signal, to restore the original audio signal.

Operation S45: The decoder in the mobile phone transmits a decoded audio signal to a processor. The processor controls a noise reduction filtering module to perform noise reduction, filtering, and enhancement on the decoded audio signal. For example, the noise reduction filtering module performs noise reduction and filtering on wind noise and another ambient noise included in the decoded audio signal, and enhances a target audio signal (for example, a human voice) in the audio signal, to improve definition and a signal-to-noise ratio of the human voice.

Operation S46: The processor of the mobile phone converts a sampling rate and a bit width of the audio signal obtained after the noise reduction, filtering, and enhancement, to complete recording. The sampling rate and the bit width of the audio signal are converted into a sampling rate and a bit width that are compatible with a system of the mobile phone. For example, a sampling rate of the audio signal is 44.1 kHz, a bit width is 24 bits, and a sampling rate and a bit width that are compatible with the system of the mobile phone are respectively 48 kHz and 16 bits. To make the sampling rate and the bit width of the audio signal compatible with the system of the mobile phone, the processor converts a 44.1 KHz/24-bit audio signal into a 48 kHz/16-bit audio signal, so that the audio signal is compatible with the system of the mobile phone.

FIG. 4(b)-1 and FIG. 4(b)-2 are a signal flow diagram of the dual-earbud recording method according to an embodiment of the application. An example in which the microphone is an analog microphone and the true wireless stereo earbud B communicates with the mobile phone is used for description.

When the user opens an application to record audio, the user selects a recording input selection interface by using the "Recording Selection" icon popped up on a display page of the mobile phone, as shown in S410. When the true wireless stereo earbud is selected as a recording interface, the true wireless stereo earbud is used for recording. When the mobile phone is selected as a recording interface, the microphone of the mobile phone is used for audio recording. For a technology of performing audio recording by using the microphone of the mobile phone, refer to the conventional technology. This is not described herein in an embodiment of the application.

The microphones of the true wireless stereo earbud A and the true wireless stereo earbud B collect the original audio signals sent by the recording object, and send the original audio signals to codec modules, as shown in S411.

An analog-to-digital converter in a codec module of the true wireless stereo earbud A converts the original audio signal from the analog signal into the digital audio signal. The analog-to-digital converter sends the digital audio signal to a PCM. The PCM converts and encodes the digital audio signal into the digital audio signal in a PCM format, and sends the digital audio signal to a PCM in a BT Chip module by using an inter-integrated circuit sound (Inter-IC Sound, I2S) bus, as shown in S412.

The I2S bus of the PCM in the BT Chip module receives the digital audio signal in a PCM format from the codec module. The PCM in the BT Chip module sends the digital audio signal in a PCM format to an encoder in the BT Chip module. The encoder in the BT Chip module of the true wireless stereo earbud A encodes the digital audio signal in a PCM format from the PCM in the BT Chip module. The processor sends an encoded digital audio signal to the Bluetooth radio frequency circuit. The Bluetooth radio frequency circuit compresses the digital audio signal and transmits the compressed digital audio signal to the BT Chip module of the true wireless stereo earbud B, as shown in S413.

The Bluetooth radio frequency circuit of the BT Chip module in the true wireless stereo earbud B receives the digital audio signal from the true wireless stereo earbud A, and transmits the digital audio signal to the processor. The processor of the true wireless stereo earbud B sends the digital audio signal to the decoder. The decoder decodes the digital audio signal from the true wireless stereo earbud A, and sends a decoded digital audio signal to the encoder in the true wireless stereo earbud B. The microphone of the true wireless stereo earbud B collects the original audio signal and sends the original audio signal to the codec module in the true wireless stereo earbud B. An analog-to-digital converter in the codec module converts the original audio signal from the analog signal into the digital audio signal. The analog-to-digital converter sends the digital audio signal to a PCM in the codec module. The PCM converts the digital audio signal into the digital audio signal in a PCM format, and sends the digital audio signal to a PCM in a BT Chip module by using the I2S bus. The PCM in the BT Chip module sends the received digital audio signal in a PCM format to the encoder. The encoder combines the digital audio signal in a PCM format from the true wireless stereo earbud B and the decoded digital audio signal from the true wireless stereo earbud A. After the two audio signals are combined, the encoder in the true wireless stereo earbud B encodes the two audio signals together and sends the two audio signals that are encoded together to the processor. The processor sends the two audio signals that are encoded together to a Bluetooth radio frequency circuit in the true wireless stereo earbud B. The Bluetooth radio frequency circuit compresses the two audio signals that are encoded together and transmits the compressed audio signals to the mobile phone, as shown in S414.

The processor of the mobile phone controls the Bluetooth radio frequency circuit to receive the digital audio signal from the true wireless stereo earbud B, as shown in S415.

The processor of the mobile phone sends the digital audio signal from the true wireless stereo earbud B to the decoder. The decoder decodes the digital signal and sends a decoded digital signal to the noise reduction filtering enhancement module. The noise reduction filtering enhancement module performs noise reduction, filtering, and enhancement on the decoded digital audio signal, enhances the target audio signal (for example, the human voice) in the audio signal, and sends the digital signal obtained after the noise reduction, filtering, and enhancement to a sampling rate and bit width conversion module. The noise reduction filtering enhancement module converts a sampling rate and a bit width into a sampling rate and a bit width that are compatible with a system of the mobile phone, and puts the sampling rate and the bit width into a recording APP for use and storage, as shown in S416.

According to the recording method of true wireless stereo earbuds disclosed in an embodiment of the application, when recording is performed by using the true wireless stereo earbud, because the true wireless stereo earbud is wireless, an activity area of the user is not limited. In addition, the true wireless stereo earbud has a relatively small size and is more convenient for the user to carry.

Embodiment 3

Figure 5A:
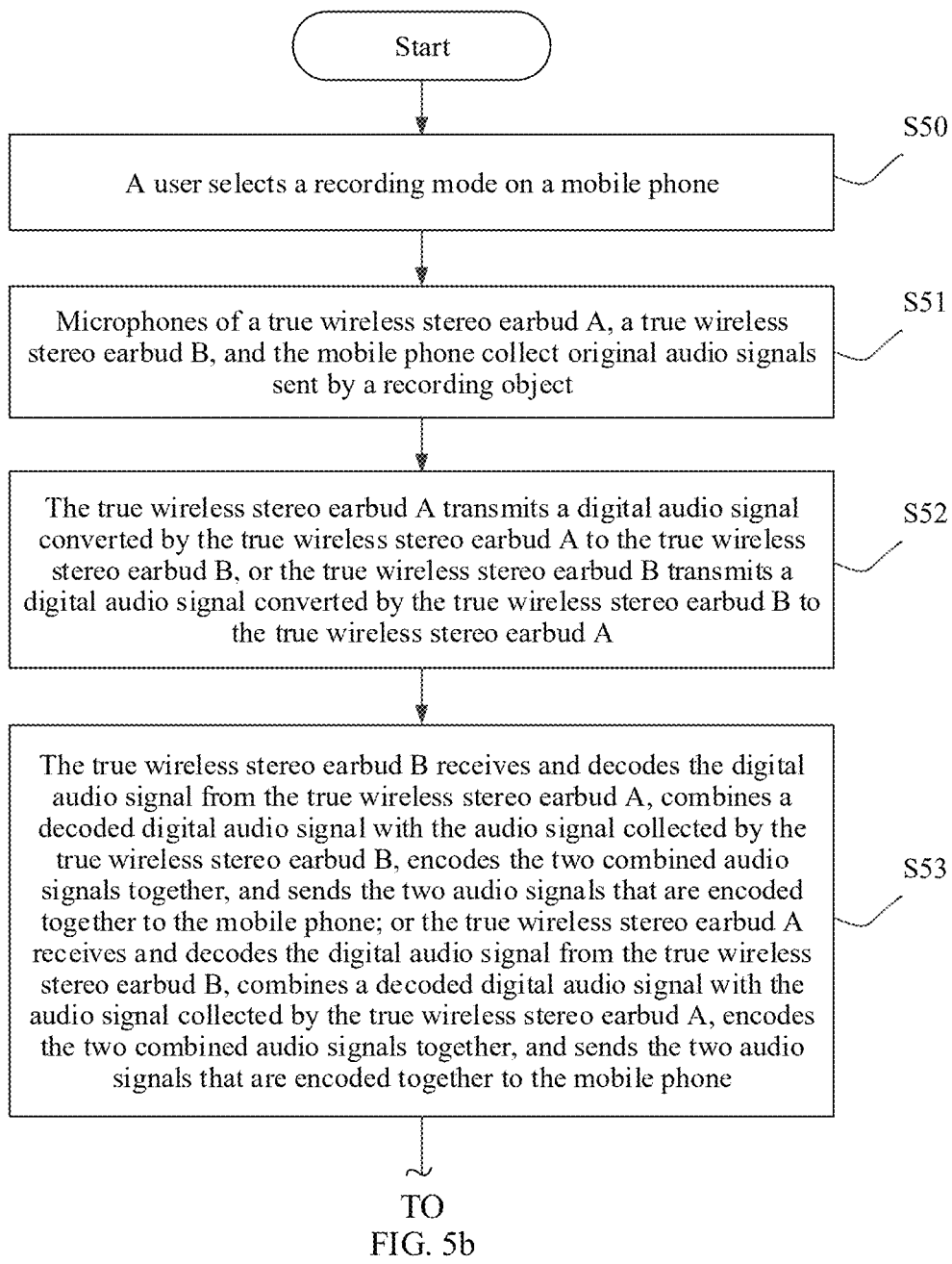
FIG. 5(a) and FIG. 5(b) are a schematic flowchart of a method for collaborative recording by using dual earbuds and a mobile phone according to an embodiment of the application.
Figure 5B:
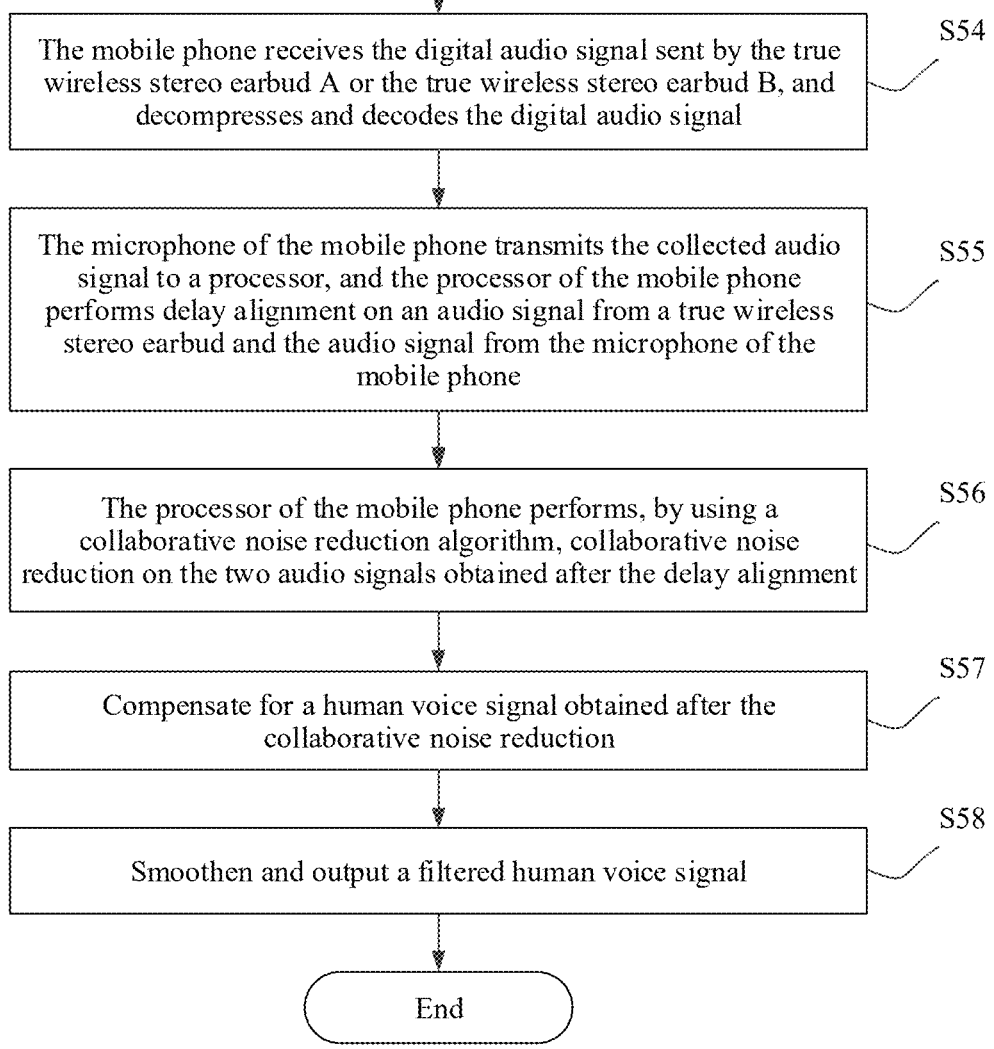

FIG. 5(a) and FIG. 5(b) are a schematic flowchart of a method for collaborative recording by using dual earbuds and a mobile phone according to an embodiment of the application. For a mode of collaborative recording by using a single earbud and the mobile phone, refer to descriptions of the foregoing embodiments and descriptions of an embodiment.

Operation S50: A user selects a recording mode on the mobile phone. The user opens a "Recording Selection" window by using a "Recording Selection" icon displayed on a video/audio recording graphical user interface on a display of the mobile phone. As shown in FIG. 2(c), the "Recording Selection" window displays three recording modes: "True Wireless Stereo Earbud", "Mobile Phone", and "Collaboration Between True Wireless Stereo Earbud and Mobile Phone". After the user taps and selects "Collaboration Between True Wireless Stereo Earbud and Mobile Phone", recording is implemented in a mode of collaboration between a true wireless stereo earbud 10 and a mobile phone 20. An embodiment of the application is described by using an example in which the user selects a mode of collaborative recording by using a true wireless stereo earbud and the mobile phone, and an example in which a mode of collaborative recording by using dual earbuds and the mobile phone is used. In a mode of collaborative recording by using the single earbud and the mobile phone, the single earbud collects an audio signal and directly transmits the audio signal to the mobile phone. That is, a microphone of a first true wireless stereo earbud or a second true wireless stereo earbud collects the audio signal from a recording object.

The first true wireless stereo earbud or the second true wireless stereo earbud transmits the audio signal collected by the first true wireless stereo earbud or the second true wireless stereo earbud to a mobile terminal in a form of a digital audio signal in a target format. The mobile terminal receives the audio signal transmitted by the second true wireless stereo earbud or the first true wireless stereo earbud in the form of the digital audio signal in the target format. The mobile terminal collects the audio signal of the recording object by using a microphone of the mobile terminal. The mobile terminal performs delay alignment on the audio signal from the second true wireless stereo earbud or the first true wireless stereo earbud and the audio signal collected by the mobile terminal. A processor of the mobile terminal performs collaborative noise reduction on the audio signals that are obtained after the delay alignment, to obtain a final recording audio signal. For processing of the audio signal transmitted by the single earbud at the mobile phone, refer to an embodiment. For a mode of performing recording by using the microphone of the mobile phone, refer to the conventional technology. For a method of performing recording by using the true wireless stereo earbud 10, refer to descriptions in the foregoing embodiments. Details are not described herein again in an embodiment of the application.

Operation S51: Microphones of a true wireless stereo earbud A (the first true wireless stereo earbud), a true wireless stereo earbud B (the second true wireless stereo earbud), and the mobile phone collect original audio signals sent by the recording object.

Operation S52: The true wireless stereo earbud A transmits a digital audio signal converted by the true wireless stereo earbud A to the true wireless stereo earbud B by using a Bluetooth chip, or the true wireless stereo earbud B transmits the digital audio signal converted by the true wireless stereo earbud B to the true wireless stereo earbud A by using a Bluetooth chip. When the digital audio signal is transmitted through a Bluetooth radio frequency circuit in the Bluetooth chip, the digital audio signal may be compressed, to reduce bandwidth occupied by Bluetooth transmission.

Operation S53: The Bluetooth chip of the true wireless stereo earbud B receives the digital audio signal from the true wireless stereo earbud A. A processor of the true wireless stereo earbud B controls a decoder to decode the digital audio signal from the true wireless stereo earbud A, and combines a decoded digital audio signal with the audio signal collected by the true wireless stereo earbud B. After the two audio signals are combined, the true wireless stereo earbud B encodes the two audio signals together. The processor controls a Bluetooth radio frequency circuit in the Bluetooth chip of the true wireless stereo earbud B to compress the audio signals that are encoded together, and transmit the compressed audio signals to the mobile phone. Alternatively, the Bluetooth chip of the true wireless stereo earbud A receives the digital audio signal from the true wireless stereo earbud B. A processor of the true wireless stereo earbud A controls a decoder to decode the digital audio signal from the true wireless stereo earbud B, and combines a decoded digital audio signal with the audio signal collected by the true wireless stereo earbud A. After the two audio signals are combined, the true wireless stereo earbud A encodes the two audio signals together. The processor controls a Bluetooth radio frequency circuit in the Bluetooth chip of the true wireless stereo earbud A to compress the audio signals that are encoded together, and transmit the compressed audio signals to the mobile phone.

Operation S54: The mobile phone receives the digital audio signal from the true wireless stereo earbud A or the true wireless stereo earbud B through Bluetooth communication, and decompresses and decodes the digital audio signal by using a decoder in an audio module of the mobile phone, to restore the original audio signal.

Operation S55: The decoder in the mobile phone transmits a decoded audio signal to a processor. The microphone of the mobile phone transmits the collected audio signal to the processor. The processor of the mobile phone performs delay alignment on the audio signal from the true wireless stereo earbud and the audio signal from the microphone of the mobile phone. A first audio signal from the true wireless stereo earbud and a second audio signal from the microphone of the mobile phone store delays. To ensure synchronization between the two audio signals, manners such as a cross-correlation method and a dynamic time warping (DTW) technology may be used to perform alignment on the two audio signals. For the DTW technology, after audio waveforms of the two audio signals are separately converted into spectrums, the DTW technology is used to calculate an optimal path between a spectrum of the first audio signal and a spectrum of the second audio signal, so that delay values of the two audio signals are obtained, to perform alignment on the two audio signals.

Operation S56: The processor of the mobile phone performs, by using a collaborative noise reduction algorithm, collaborative noise reduction on the two audio signals that are obtained after the delay alignment. For collaborative noise reduction, the processor first detects, by using a human voice recognition technology, a human voice signal in the audio signal from the true wireless stereo earbud A or the true wireless stereo earbud B. Then the processor simultaneously performs noise filtering on the recognized human voice signal and the audio signal collected by the microphone of the mobile phone. After comparing the human voice signal with the audio signal collected by the microphone of the mobile phone, the processor retains, by using the human voice signal as a reference, the human voice signal in the audio signal collected by the microphone of the mobile phone, and filters out a noise signal. In addition, the processor compares the noise signal with the audio signal from the true wireless stereo earbud A or the true wireless stereo earbud B (human voice filtering), to filter out a noise signal matching the noise signal in the audio signal from the true wireless stereo earbud A or the true wireless stereo earbud B, and retain the human voice signal in the audio signal from the true wireless stereo earbud A or the true wireless stereo earbud B as a final clean human voice signal.

Operation S57: Compensate for the human voice signal obtained after the collaborative noise reduction. In the filtering process in operation S56, the human voice signal is damaged. To improve auditory experience of the user, the human voice may be compensated and slight noise may be added, so that the user can hear a more natural sound. The human voice is mainly compensated for unvoiced sound and harmonics. For a technology thereof, refer to the conventional technology. Details are not described herein in an embodiment of the present disclosure.

Operation S58: Perform smoothing output on the filtered human voice signal. In a process in which the audio signal is processed, the audio signal has a volume change. The smoothing output is to smooth a gain after filtering compensation, to avoid a phenomenon that a sound is unstable due to artificially supplemented information, and keep the volume stable.

According to the recording method of true wireless stereo earbuds disclosed in an embodiment of the application, when recording is performed by using the true wireless stereo earbud, because the true wireless stereo earbud is wireless, an activity area of the user is not limited. In addition, the true wireless stereo earbud has a relatively small size and is more convenient for the user to carry. In addition, in the application, by using the method for collaborative recording by using the mobile phone and the true wireless stereo earbud, recording with more complete data amount can be collected, and cooperative noise reduction is performed on a recording signal collected by the mobile phone and a recording signal collected by the true wireless stereo earbud, so that accuracy and integrity of the human voice signal obtained through separation are higher.

Embodiment 4

Refer to FIG. 6(*a*)-1, FIG. 6(*a*)-2, FIG. 6(*b*)-1, FIG. 6(*b*)-2, and FIG. 6(*b*)-3. FIG. 6(*a*)-1 and FIG. 6(*a*)-2 are a schematic flowchart of a karaoke recording method of true wireless stereo earbuds according to an embodiment of the application. FIG. 6(*b*)-1, FIG. 6(*b*)-2, and FIG. 6(*b*)-3 are a schematic thread diagram of the karaoke recording method of true wireless stereo earbuds according to an embodiment of the application. In an embodiment, collaboration between a pair of (two) true wireless stereo earbuds and a mobile phone is used as an example for description.

Operation S60: A user selects a recording mode on the mobile phone. The user opens a "Recording Selection" window by using a "Recording Selection" icon displayed on a video/audio recording graphical user interface on a display of the mobile phone. As shown in FIG. 2(*c*), the "Recording Selection" window displays three recording modes: "True Wireless Stereo Earbud", "Mobile Phone", and "Collaboration Between True Wireless Stereo Earbud and Mobile Phone". After the user taps and selects "True Wireless Stereo Earbud", recording is implemented by using a true wireless stereo earbud 10. In an embodiment of the application, an example in which the user selects a mode of recording by a true wireless stereo earbud is used for description. For a mode of recording by using a microphone of the mobile phone, refer to the conventional technology. Details are not described herein in an embodiment of the application.

Operation S61: A microphone of a true wireless stereo earbud A collects an audio signal sent by a recording object and uses the audio signal as an uplink signal A. A microphone of a true wireless stereo earbud B collects an audio signal sent by the recording object and uses the audio signal as an uplink signal B.

Operation S62: An analog-to-digital converter and a PCM convert the uplink signal A into a digital audio signal in a PCM format, an echo cancellation module of the true wireless stereo earbud A performs echo cancellation and preprocessing on the digital audio signal, and a Bluetooth chip of the true wireless stereo earbud A compresses the digital audio signal and sends the compressed digital audio signal to the true wireless stereo earbud B. A microphone and a speaker of the true wireless stereo earbud are relatively close to each other. An audio signal collected by the microphone includes an audio signal sent by the speaker, which causes an echo and squealing. In addition, the audio signal collected by the true wireless stereo earbud includes a large amount of noise, which affects definition of the audio signal sent by the recording object. Echo cancellation and preprocessing in the true wireless stereo earbud A are intended to eliminate the echo of the earbud and avoid squealing. A DNN noise reduction algorithm or another single-microphone noise reduction algorithm may be used to perform noise reduction on the audio signal collected by the true wireless stereo earbud, to remove noise in the audio signal collected by the microphone.

Operation S63: The true wireless stereo earbud B converts the uplink signal B into a digital audio signal in a PCM format by using an analog-to-digital converter and a PCM, performs echo cancellation and preprocessing on the digital audio signal by using an echo cancellation module of the true wireless stereo earbud B, and decodes the uplink signal A from the true wireless stereo earbud A.

Operation S64: A processor of the true wireless stereo earbud B performs delay alignment on the uplink signal B obtained after the echo cancellation and preprocessing and a decoded uplink signal A. The uplink signal B and the uplink signal A may be aligned in a manner such as a cross-correlation method, correlation detection, a dynamic time warping (DTW) technology, or a voice recognition algorithm. For the DTW technology, after audio waveforms of the uplink signal B and the uplink signal A are separately converted into spectrums, the DTW technology is used to calculate an optimal path between a spectrum of the uplink signal B and a spectrum of the uplink signal A, so that a delay value of the uplink signal B and a delay value of the uplink signal A are obtained, to align the uplink signal B with the uplink signal A.

Operation S65: A noise reduction filtering module of the true wireless stereo earbud B performs multi-microphone noise reduction on the uplink signal A and uplink signal B that are obtained after the delay alignment. The multi-microphone noise reduction may be performed by using an algorithm such as beamforming, to improve a signal-to-noise ratio of a human voice, and reduce interference caused by ambient noise to the human voice.

Operation S66: The processor of the true wireless stereo earbud B performs audio mixing on accompaniment output by the mobile phone and the uplink signal A and the uplink signal B that are obtained after the noise reduction, to achieve effect of singing karaoke. A signal obtained after the audio mixing on the uplink signal A, the uplink signal B, and the accompaniment signal is output as a downlink signal. The accompaniment output by the mobile phone is encoded by the processor of the mobile phone and then transmitted to the true wireless stereo earbud B through Bluetooth transmission.

Operation S67: The processor of the true wireless stereo earbud B plays the downlink signal by using a speaker of the true wireless stereo earbud B. The processor encodes the downlink signal, compresses an encoded downlink signal, and sends the compressed downlink signal to the true wireless stereo earbud A and the mobile phone by using a Bluetooth chip of the true wireless stereo earbud B. The processor of the true wireless stereo earbud B transmits the downlink signal to a PCM of the true wireless stereo earbud B. The PCM converts the digital audio signal in a PCM format into a digital audio signal in a non-PCM format. A digital-to-analog converter of the true wireless stereo earbud B converts the digital audio signal in a non-PCM format into an analog signal for playing by the speaker. To ensure that speakers of the true wireless stereo earbud A and the true wireless stereo earbud B simultaneously play the downlink signal, delay compensation may be performed on the true wireless stereo earbud B, to ensure that the true wireless stereo earbud B and the true wireless stereo earbud A simultaneously play the downlink signal. For example, when the delay compensation is not performed, a delay difference between the true wireless stereo earbud A and the true wireless stereo earbud B when playing the downlink signal is measured. Generally, after the true wireless stereo earbud A receives the downlink signal, operations such as signal decoding needs to be performed. Due to a relatively long time period required for a speaker of the true wireless stereo earbud A to start playing the downlink signal, time for playing the downlink signal by the true wireless stereo earbud B may be delayed. The delayed time is the foregoing delay difference. In this way, an objective of synchronous playing of the downlink signals by the true wireless stereo earbud A and the true wireless stereo earbud B can be achieved.

Operation S68: A decoder in the true wireless stereo earbud A decodes the downlink signal, performs digital-to-analog conversion on a decoded digital signal, and plays the downlink signal by using the speaker of the true wireless stereo earbud A in a manner of the analog signal. After the mobile phone receives the downlink signal, a decoder in the mobile phone decodes the downlink signal and sends a decoded downlink signal to a karaoke application for buffering. The mobile phone can determine whether an interface between the true wireless stereo earbud and the karaoke application is available, to perform a process of recording by the true wireless stereo earbud.

FIG. 6(b)-1, FIG. 6(b)-2, and FIG. 6(b)-3 are a signal flow diagram of the karaoke recording method of true wireless stereo earbuds according to an embodiment of the application. An example in which the microphone is an analog microphone is used for description.

The microphone of the true wireless stereo earbud A collects the audio signal sent by the recording object, and uses the audio signal as the uplink signal A. The microphone of the true wireless stereo earbud B collects the audio signal sent by the recording object, and uses the audio signal as the uplink signal B. The uplink signal A and the uplink signal B are respectively sent to a codec module of the true wireless stereo earbud A and a codec module of the true wireless stereo earbud B, as shown in S610.

The codec module of the true wireless stereo earbud A receives the uplink signal A. The analog-to-digital converter in the codec module of the true wireless stereo earbud A converts the analog signal into a digital signal and sends the digital signal to the PCM in the codec module. The PCM modulates the digital signal into the digital audio signal in a PCM format, and sends the digital audio signal in a PCM format to a PCM in a BT Chip module of the true wireless stereo earbud A by using an I2S bus. The codec module of the true wireless stereo earbud B receives the uplink signal B. The analog-to-digital converter in the codec module of the true wireless stereo earbud B converts the analog signal into a digital signal and sends the digital signal to the PCM. The PCM modulates the digital signal into the digital audio signal in a PCM format, and sends the digital audio signal in a PCM format to a PCM in a BT Chip module of the true wireless stereo earbud B by using an I2S bus, as shown in S611.

The PCM in the BT Chip module receives the digital audio signal in a PCM format from the codec module by using the I2S bus, sends the signal to the echo cancellation module in the BT Chip module of the true wireless stereo earbud A for echo cancellation and preprocessing, and sends the signal to an encoder. The encoder encodes the uplink signal A and sends an encoded uplink signal A to a processor. The processor sends the uplink signal A to a Bluetooth radio frequency circuit. The Bluetooth radio frequency circuit of the true wireless stereo earbud A compresses the uplink signal A and sends the compressed uplink signal A to the BT Chip module of the true wireless stereo earbud B, as shown in S612. An echo cancellation and preprocessing module in the BT Chip module of the true wireless stereo earbud B performs echo cancellation and preprocessing on the uplink signal B, and sends an echo-cancelled and preprocessed uplink signal B to an uplink delay alignment module.

A Bluetooth radio frequency circuit in the BT Chip module of the true wireless stereo earbud B receives the uplink signal A from the true wireless stereo earbud A, and sends the uplink signal A to a processor. The processor sends the uplink signal A to a decoder. The decoder decodes the uplink signal A from the true wireless stereo earbud A, and separately sends a decoded uplink signal A to the uplink delay alignment module and an accompaniment audio mixing module, as shown in S613.

The uplink delay alignment module in the BT Chip module of the true wireless stereo earbud B performs delay alignment on the uplink signal B obtained after the echo cancellation and preprocessing and the decoded uplink signal A, and sends the signals that are obtained after the delay alignment to a noise reduction filtering module, as shown in S614.

The noise reduction filtering module of the true wireless stereo earbud B performs multi-microphone noise reduction on the uplink signal A and the uplink signal B that are obtained after the delay alignment, and sends the uplink signal A and the uplink signal B that are obtained after the noise reduction to the accompaniment audio mixing module. The multi-microphone noise reduction may be performed by using a beamforming algorithm, as shown in S615.

The accompaniment audio mixing module of the true wireless stereo earbud B performs audio mixing on accompaniment output by the mobile phone, and the uplink signal A and the uplink signal B that are obtained after the noise reduction, and sends a downlink signal obtained after the audio mixing to a delay compensation module and the encoder, as shown in S616.

The delay compensation module of the true wireless stereo earbud B performs delay compensation on the downlink signal, to ensure that the true wireless stereo earbud B and the true wireless stereo earbud A simultaneously play an audio mixing signal. The downlink signal obtained after the delay compensation is sent to an echo cancellation and preprocessing module for echo cancellation and preprocessing. Then the downlink signal is sent to the PCM in the BT Chip module. The PCM in the BT Chip module sends the downlink signal to a PCM in the codec module of the true wireless stereo earbud B by using the I2S bus. The pulse code modulation PCM in the codec module modulates the downlink signal into the downlink signal in a non-PCM format, and sends the downlink signal in a non-PCM format to the digital-to-analog converter. The digital-to-analog converter converts the digital signal in a non-PCM format into the analog signal and sends the analog signal to the speaker of the true wireless stereo earbud B. The true wireless stereo earbud B plays the downlink signal by using the speaker of the true wireless stereo earbud B. The delay compensation means that the true wireless stereo earbud B plays the audio mixing signal after predetermined delay time. For example, when delay compensation is not performed, the delay difference between the true wireless stereo earbud A and the true wireless stereo earbud B when playing the downlink signal is measured. Generally, after the true wireless stereo earbud A receives the downlink signal, operations such as signal decoding need to be performed. Due to the relatively long time period required for the speaker of the true wireless stereo earbud A to start playing the downlink signal, time for playing the downlink signal by the true wireless stereo earbud B may be delayed. The delayed time is the foregoing delay difference. In this way, the objective of synchronous playing of the downlink signals by the true wireless stereo earbud A and the true wireless stereo earbud B can be achieved, as shown in S617. In addition, the downlink signal is sent to the encoder for encoding, and an encoded downlink signal is sent to the processor. The processor sends the encoded downlink signal to the Bluetooth radio frequency circuit. The Bluetooth radio frequency circuit compresses the downlink signal, and sends the compressed downlink signal to the true wireless stereo earbud A and the mobile phone.

The Bluetooth radio frequency circuit in the BT Chip module of the true wireless stereo earbud A receives the downlink signal and sends the downlink signal to the processor. The processor sends the downlink signal to the decoder. The decoder decodes the downlink signal and sends a decoded downlink signal to the echo cancellation and preprocessing module for echo cancellation and preprocessing. The downlink signal obtained after the echo cancellation and preprocessing is sent to a PCM in the BT Chip module. The PCM in the BT Chip module sends the digital audio signal in a PCM format to the codec module of the true wireless stereo earbud A. The PCM in the codec module sends a downlink signal in a PCM format to the digital-to-analog converter by using the I2C. The digital-to-analog converter performs digital-to-analog conversion on a decoded digital signal, and sends the downlink signal to the speaker of the true wireless stereo earbud A. The speaker of the true wireless stereo earbud A plays the downlink signal in a manner of the analog signal, as shown in S618.

After receiving the downlink signal, a Bluetooth radio frequency circuit of the mobile phone sends the downlink signal to the processor. The processor sends the downlink signal to the decoder in the mobile phone. The decoder in the mobile phone decodes the downlink signal and transmits a decoded downlink signal to the recording APP for buffering. It should be noted that the recording APP needs to include an interface with the true wireless stereo earbud, so that the recording APP can perform recording by using the true wireless stereo earbud.

According to the recording method of true wireless stereo earbuds disclosed in an embodiment of the application, when recording is performed by using the true wireless stereo earbud, because the true wireless stereo earbud is wireless, an activity area of the user is not limited. In addition, the true wireless stereo earbud has a relatively small size and is more convenient for the user to carry. In addition, according to the karaoke recording method of true wireless stereo earbuds in the application, after two true wireless stereo earbuds collect recording signals, the true wireless stereo earbud B can perform delay alignment on an audio signal from the true wireless stereo earbud A and an audio signal collected by the true wireless stereo earbud B, to ensure synchronous playing of audio by the speakers of the true wireless stereo earbud A and the true wireless stereo earbud B. Further, the true wireless stereo earbud B can perform audio mixing on an accompaniment signal and the two audio signals obtained after the delay alignment, and separately play a complete audio mixing signal by using the speaker of the true wireless stereo earbud B and the speaker of the true wireless stereo earbud A, to ensure consistency of the audio mixing signal played by the true wireless stereo earbud A and the true wireless stereo earbud B. Further, when the true wireless stereo earbud A and the true wireless stereo earbud B play the audio mixing signal, delay compensation is performed on the audio mixing signal played by the true wireless stereo earbud B. This further ensures synchronous playing of audio by the speakers of the true wireless stereo earbud A and the true wireless stereo earbud B.

Embodiment 5

Figure 7A:
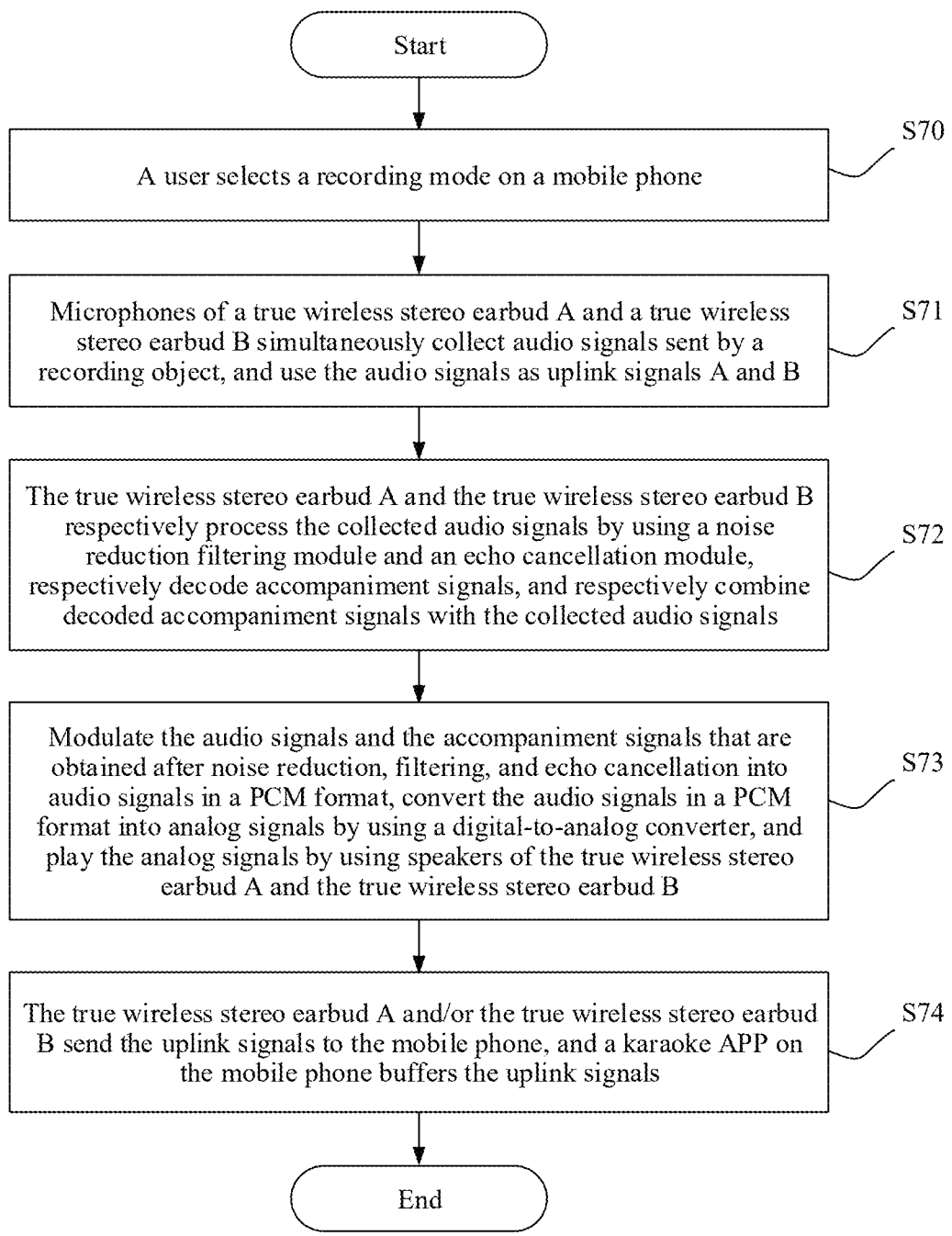
FIG. 7(a) is a schematic flowchart of another karaoke recording method of true wireless stereo earbuds according to an embodiment of the application.
Figures 1, 7B:
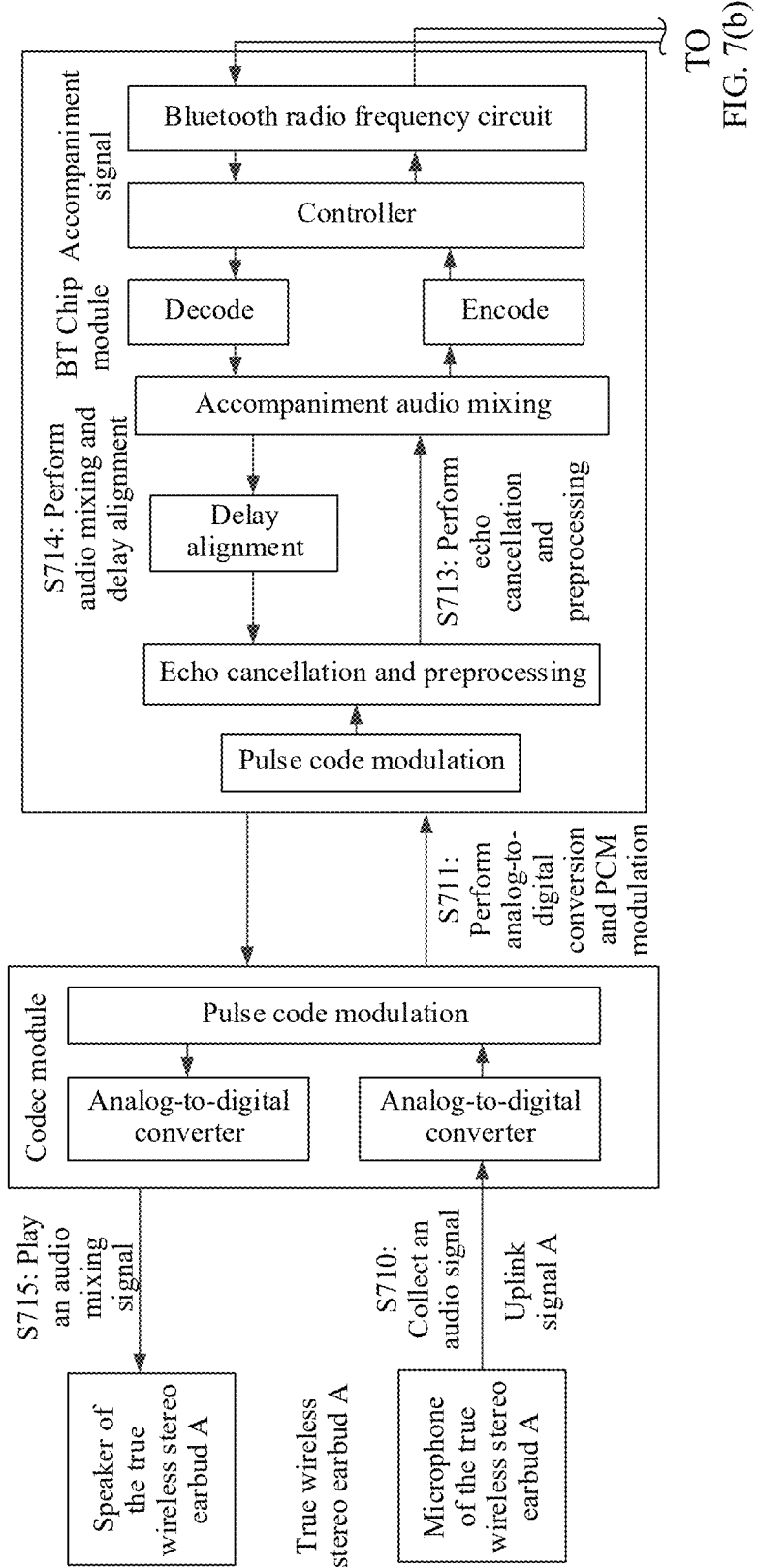
Figure 7B:
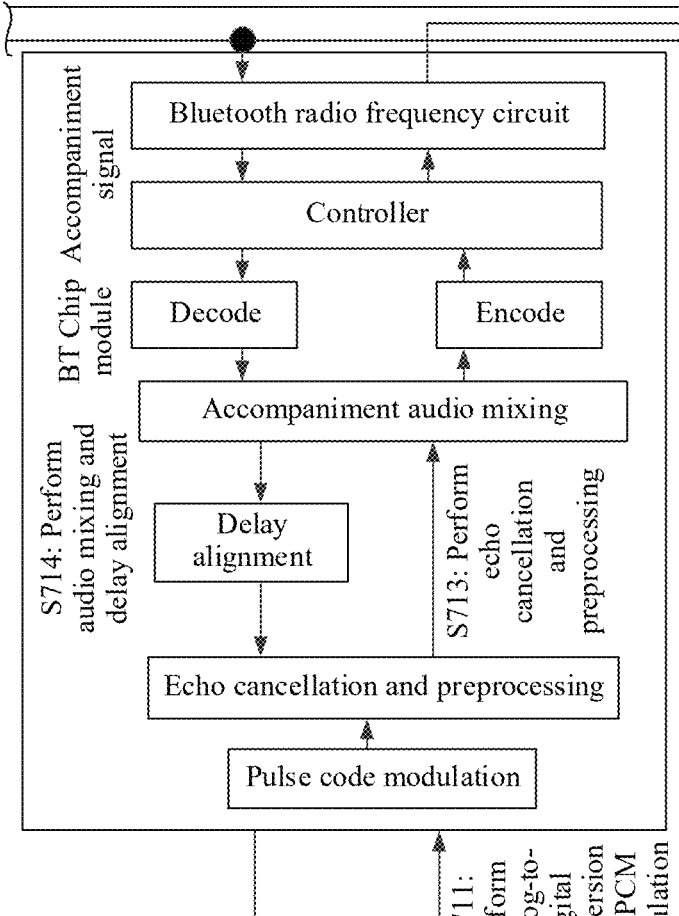
Figure 2:
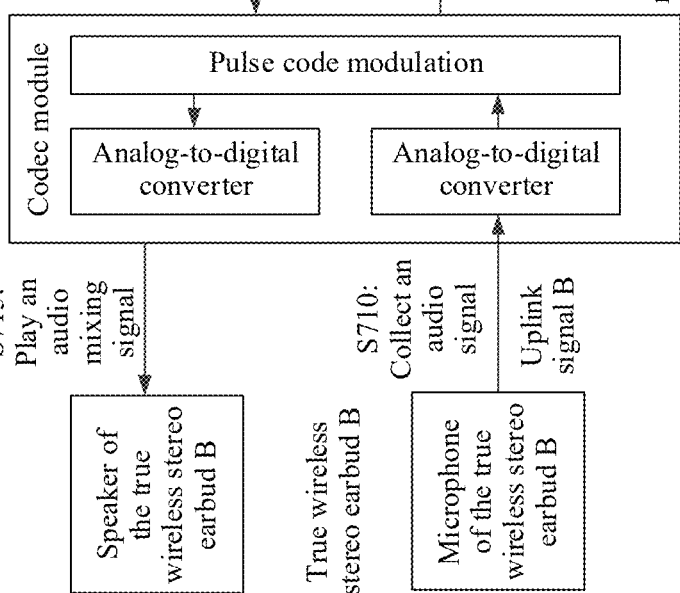

FIG. 7(a) is a schematic flowchart of another karaoke recording method of true wireless stereo earbuds according to an embodiment of the application. FIG. 7(b)-1, FIG. 7(b)-2, and FIG. 7(b)-3 are a schematic thread diagram of the another karaoke recording method of true wireless stereo earbuds according to an embodiment of the application.

Operation S70: A user selects a recording mode on a mobile phone. The user opens a "Recording Selection" window by using a "Recording Selection" icon displayed on a video/audio recording graphical user interface on a display of the mobile phone. As shown in FIG. 2(c), the "Recording Selection" window displays three recording modes: "True Wireless Stereo Earbud", "Mobile Phone", and "Collaboration Between True Wireless Stereo Earbud and Mobile Phone". After the user taps and selects "True Wireless Stereo Earbud", recording is implemented by using a true wireless stereo earbud 10. In an embodiment of the application, an example in which the user selects a mode of recording by a true wireless stereo earbud is used for description.

Operation S71: Microphones of a true wireless stereo earbud A (a first true wireless stereo earbud) and a true wireless stereo earbud B (a second true wireless stereo earbud) simultaneously collect audio signals sent by a recording object as uplink signals. Analog-to-digital converters and PCMs of the true wireless stereo earbud A and the true wireless stereo earbud B convert the audio signals into digital signals in a PCM format, and simultaneously receive an accompaniment signal compressed and sent by the mobile phone through Bluetooth. If a delay difference between the true wireless stereo earbud A and the true wireless stereo earbud B is excessively large, when the mobile phone sends the accompaniment signal to the true wireless stereo earbud A or the true wireless stereo earbud B, the mobile phone needs to send a synchronous cadence signal in a signaling manner. The synchronous cadence signal has a fixed period, and is used to calibrate play clocks 3 of the true wireless stereo earbud A and the true wireless stereo earbud B, so that the true wireless stereo earbud A and the true wireless stereo earbud B play synchronously. The synchronous cadence signal is periodically sent at a fixed interval, for example, sent once every 10 milliseconds. Message content carried in the synchronous cadence signal occupies two bytes. Each sending of the synchronous cadence signal is counted once, so that a clock for adjusting a speed during playing is provided for a true wireless stereo earbud.

Operation S72: A processor of the true wireless stereo earbud A processes, by using a noise reduction filtering module and an echo cancellation module, an audio signal collected by the microphone of the true wireless stereo earbud A. A decoder in the true wireless stereo earbud A decodes the accompaniment signal and combines a decoded accompaniment signal with the audio signal collected by the microphone of the true wireless stereo earbud A. The noise reduction filtering module and the echo cancellation module perform noise reduction, filtering, and echo cancellation on the combined audio signal and accompaniment signal. A processor of the true wireless stereo earbud B processes, by using a noise reduction filtering module and an echo cancellation module, an audio signal collected by the microphone of the true wireless stereo earbud B. A decoder in the true wireless stereo earbud B decodes the accompaniment signal and combines a decoded accompaniment signal with the audio signal collected by the microphone of the true wireless stereo earbud B. The noise reduction filtering module and the echo cancellation module perform noise reduction, filtering, and echo cancellation on the combined audio signal and accompaniment signal.

Operation S73: The processor of the true wireless stereo earbud A modulates the audio signal and the accompaniment signal that are obtained after the noise reduction, filtering, and echo cancellation into digital audio signals in a non-PCM format. The processor converts the audio signals in a PCM format into analog signals by using a digital-to-analog converter, and plays the analog signals by using a speaker of the true wireless stereo earbud A. The processor of the true wireless stereo earbud B modulates the audio signal and the accompaniment signal that are obtained after the noise reduction, filtering, and echo cancellation into audio signals in a PCM format. The processor converts the audio signals in a PCM format into analog signals by using a digital-to-analog converter, and plays the analog signals by using a speaker of the true wireless stereo earbud B. When the true wireless stereo earbud A and the true wireless stereo earbud B play an audio mixing signal obtained through audio mixing of the audio signal and the accompaniment signal, due to factors such as signal transmission and signal processing, a delay difference occurs when the true wireless stereo earbud A and the true wireless stereo earbud B play the audio mixing signal. To ensure that the true wireless stereo earbud A and the true wireless stereo earbud B simultaneously play the audio mixing signal, in an embodiment of the application, a data adjustment delay is stored in the processor of the true wireless stereo earbud A and/or the processor of the true wireless stereo earbud B. For example, the delay difference between playing the audio mixing signal by the true wireless stereo earbud A and playing the audio mixing signal by the true wireless stereo earbud B is measured in advance. If the speaker of the true wireless stereo earbud A takes less time for playing the audio mixing signal, time for playing the audio mixing signal by the true wireless stereo earbud A is delayed. If the speaker of the true wireless stereo earbud B takes less time for playing the audio mixing signal, time for playing the audio mixing signal by the true wireless stereo earbud A is delayed. This ensures synchronous playing of the audio mixing signal by the true wireless stereo earbud A and the true wireless stereo earbud B.

Operation S74: The true wireless stereo earbud A and/or the true wireless stereo earbud B send the uplink signals to the mobile phone. A karaoke APP on the mobile phone buffers the uplink signals. The true wireless stereo earbud A and/or the true wireless stereo earbud B compress and send the uplink signals to the mobile phone by using a Bluetooth chip. The mobile phone receives the uplink signals through Bluetooth.

FIG. 7(b)-1, FIG. 7(b)-2, and FIG. 7(b)-3 are a signal flow diagram of the another karaoke recording method of true wireless stereo earbuds according to an embodiment of the application.

The microphone of the true wireless stereo earbud A and the microphone of the true wireless stereo earbud B simultaneously collect the audio signal sent by the recording object, and respectively send the audio signal as the uplink signal to a codec module of the true wireless stereo earbud A and a codec module of the true wireless stereo earbud B, as shown in S710.

Analog-to-digital converters in the codec modules of the true wireless stereo earbud A and the true wireless stereo earbud B respectively convert their respective uplink signals from analog signals into digital signals, and send the digital signals to PCMs. The PCMs perform PCM conversion on the digital audio signals to obtain digital audio signals in a PCM format. The PCMs of the BT Chip modules receive the digital audio signals in a PCM format from the codec modules by using the I2S bus, and send the digital audio signals to the PCMs in the BT Chip modules of the true wireless stereo earbud A and the true wireless stereo earbud B, as shown in S711.

A recording APP on the mobile phone sends the accompaniment signal to an encoder. The encoder encodes the accompaniment signal and sends an encoded accompaniment signal to a processor. The processor sends the encoded accompaniment signal to a Bluetooth radio frequency circuit. The Bluetooth radio frequency circuit sends the accompaniment signal to BT Chip modules of the true wireless stereo earbud A and the true wireless stereo earbud B. Bluetooth radio frequency circuits in the BT Chip modules of the true wireless stereo earbud A and the true wireless stereo earbud B simultaneously receive the accompaniment signal sent by the mobile phone, as shown in S712.

A Bluetooth radio frequency circuit in the true wireless stereo earbud A sends the accompaniment signal to the processor. The processor sends the accompaniment signal to the decoder for decoding. The decoder sends the decoded accompaniment signal to the accompaniment audio mixing module. The PCM in the BT Chip module of the true wireless stereo earbud A sends the digital audio signal in a PCM format from the codec module to the echo cancellation and preprocessing module by using the I2S bus. The echo cancellation and preprocessing module performs echo cancellation and preprocessing on the digital audio signal in a PCM format from the codec module, and then sends the digital audio signal obtained after the echo cancellation and preprocessing to the accompaniment audio mixing module. The accompaniment audio mixing module performs audio mixing on the decoded accompaniment signal and the digital audio signal from the codec module of the true wireless stereo earbud A, and sends the audio mixing signal to a delay alignment module. The Bluetooth radio frequency circuit in the true wireless stereo earbud B sends the accompaniment signal to the processor. The processor sends the accompaniment signal to the decoder for decoding. The decoder sends the decoded accompaniment signal to the accompaniment audio mixing module. The PCM in the BT Chip module of the true wireless stereo earbud B sends the digital audio signal in a PCM format from the codec module to the echo cancellation and preprocessing module by using the I2S bus. The echo cancellation and preprocessing module performs echo cancellation and preprocessing on the digital audio signal in a PCM format from the codec module, and sends the digital audio signal obtained after the echo cancellation and preprocessing to the accompaniment audio mixing module. The accompaniment audio mixing module performs audio mixing on the decoded accompaniment signal and the digital audio signal from the codec module of the true wireless stereo earbud B, and sends the audio mixing signal to the delay alignment module, as shown in S713.

The delay alignment module in the true wireless stereo earbud A performs delay adjustment on the audio mixing signal obtained after the audio mixing and the audio mixing signal of the true wireless stereo earbud B. The delay alignment module sends audio mixing signal obtained after the delay adjustment to the echo cancellation and preprocessing module for echo cancellation and preprocessing. The echo cancellation and preprocessing module sends the audio mixing signal to the PCM in the BT Chip module of the true wireless stereo earbud A. The PCM in the BT Chip module sends the digital audio signal in a PCM format to the codec module of the left true wireless stereo earbud A. The codec module in the true wireless stereo earbud B performs delay adjustment on the audio mixing signal obtained after the audio mixing and the audio mixing signal of the true wireless stereo earbud A. The codec module sends audio mixing signal obtained after audio mixing to the echo cancellation and preprocessing module for echo cancellation and preprocessing. The echo cancellation and preprocessing module sends audio mixing signal obtained after the echo cancellation and preprocessing to the PCM in the BT Chip module of the true wireless stereo earbud B. The PCM in the BT Chip module sends the digital audio signal in a PCM format to the codec module of the right true wireless stereo earbud, as shown in S714.

The PCM in the codec module of the true wireless stereo earbud A sends, to the digital-to-analog converter, digital audio signals in a PCM format that are modulated from the audio signal and the accompaniment signal that are obtained after the delay adjustment. The digital-to-analog converter converts the digital audio signals in a PCM format into the analog signals. The speaker of the true wireless stereo earbud A plays the analog signals. The PCM in the codec module of the true wireless stereo earbud B modulates audio signal and accompaniment signal that are obtained after the delay adjustment, and the digital audio signal in a PCM format from the PCM in the BT Chip module into audio signals in a PCM format, and sends the audio signals in a PCM format to the digital-to-analog converter. The digital audio signals in a PCM format are converted into the analog signals by the digital-to-analog converter, and are played by the speaker of the true wireless stereo earbud B, as shown in S715.

The true wireless stereo earbud A and/or the true wireless stereo earbud B send, to the mobile phone through the Bluetooth radio frequency circuit, an uplink signal obtained after analog-to-digital conversion, PCM, echo cancellation and preprocessing, audio mixing on the accompaniment signal, and encoding. A Bluetooth radio frequency circuit in the mobile phone receives the uplink signal and sends the uplink signal to a decoder in the mobile phone for decoding, and the karaoke APP on the mobile phone buffers the uplink signal.

It should be noted that karaoke is implemented through collaboration between a single earbud and a terminal device as follows: The microphone of the first true wireless stereo earbud or the second true wireless stereo earbud collects the audio signal from the recording object. The first true wireless stereo earbud or the second true wireless stereo earbud transmits, in a form of a digital audio signal in a target format, the audio signal collected by the first true wireless stereo earbud or the second true wireless stereo earbud to the terminal device. The microphone of a first true wireless stereo earbud collects and decodes an accompaniment audio signal from the terminal device. The first true wireless stereo earbud combines a decoded accompaniment audio signal and the audio signal collected by using the microphone of the first true wireless stereo earbud. The first true wireless stereo earbud performs delay compensation on an audio mixing signal. The first true wireless stereo earbud plays, by using the speaker of the first true wireless stereo earbud, the audio mixing signal obtained after the delay compensation, and transmits the audio mixing signal to the second true wireless stereo earbud. The second true wireless stereo earbud and the first true wireless stereo earbud simultaneously play the audio mixing signal.

According to the recording method of true wireless stereo earbuds disclosed in an embodiment of the application, when recording is performed by using the true wireless stereo earbud, because the true wireless stereo earbud is wireless, an activity area of the user is not limited. In addition, the true wireless stereo earbud has a relatively small size and is more convenient for the user to carry. In addition, the microphones of the true wireless stereo earbud A and the true wireless stereo earbud B respectively collect the audio signals, and play the audio signal by using respective speakers. Audio playing efficiency of the audio signal is relatively high. In addition, when the true wireless stereo earbud A and the true wireless stereo earbud B play the audio signal, delay compensation is performed, thereby ensuring synchronous playing of audio by the true wireless stereo earbud A and the true wireless stereo earbud B, and improving user experience.

Embodiments of a mechanism disclosed in the application may be implemented in hardware, software, firmware, or a combination thereof. Embodiments of the application may be implemented as a computer program or program code executed in a programmable system. The programmable system includes at least one processor, a storage system (including a volatile memory, a nonvolatile memory, and/or a storage element), at least one input device, and at least one output device. The program code may be applied to input instructions, to perform functions described in the application and generate output information. The output information may be applied to one or more output devices in a known manner. For a purpose of the application, a processing system includes any system with a processor such as a digital signal processor (DSP), a microcontroller, an application-specific integrated circuit (ASIC), or a microprocessor.

The program code may be implemented by using a high-level programming language or an object oriented programming language, to communicate with the processing system. The program code may alternatively be implemented by using an assembly language or a machine language when needed. Actually, the mechanism described in the application is not limited to a scope of any particular programming language. In any case, the language may be a compiled language or an interpretive language.

In some cases, the disclosed embodiments may be implemented by hardware, firmware, software, or any combination thereof. The disclosed embodiments may be alternatively implemented as instructions carried by or stored on one or more temporary or non-temporary machine-readable (for example, computer-readable) storage media, and the instructions may be read and executed by one or more processors. For example, the instructions may be distributed through a network or another computer-readable medium. Therefore, the machine-readable medium may include any mechanism for storing or transmitting information in a machine (for example, a computer) readable form, including but not limited to a floppy disk, a compact disc, an optical disc, a read-only memory (CD-ROMs), a magnetic optical disk, a read-only memory (ROM), a random access memory (RAM), an erasable programmable read-only memory (EPROM), an electrically erasable programmable read-only memory (EEPROM), a magnetic card, an optical card, a flash memory, or a tangible machine-readable memory used to transmit information (for example, a carrier, an infrared signal, or a digital signal) by using a propagating signal in an electrical, optical, acoustic, or another form over the Internet. Therefore, the machine-readable medium includes any type of machine-readable medium that is suitable for storing or transmitting electronic instructions or information in a machine (for example, a computer)-readable form.

It should be noted that all units/modules mentioned in the device embodiments of the application are logical units/modules. Physically, one logical unit/module may be one physical unit/module, or may be a part of one physical unit/module, or may be implemented by a combination of a plurality of physical units/modules. Physical implementations of these logical units/modules are not most important, and a combination of functions implemented by these logical units/modules is a key to resolving the technical problem proposed in the application. In addition, to highlight an innovative part of the application, a unit/module that is not closely related to resolving the technical problem proposed in the application is not introduced in the foregoing device embodiments of the application. This does not indicate that there is not another unit/module in the foregoing device embodiments.

It should be noted that, in the examples and specification of this patent, relational terms such as first and second are only used to distinguish one entity or operation from another entity or operation, and do not necessarily require or imply that any actual relationship or sequence exists between these entities or operations. Moreover, the terms "include", "contain", or any other variant is intended to cover a non-exclusive inclusion, so that a process, a method, an article, or a device that includes a list of elements not only includes those elements but also includes other elements that are not expressly listed, or further includes elements inherent to such a process, method, article, or device. An element preceded by "includes a" does not, without more constraints, preclude the presence of additional identical elements in the process, method, article, or device that includes the element. Although the application has been illustrated and described with reference to some example embodiments of this application, one of ordinary skilled in the art should understand that various changes may be made to this application in form and detail without departing from the spirit and scope of this application.

What is claimed is:

1. A recording method of true wireless stereo earbuds, comprising:
    collecting, by a first true wireless stereo earbud of the true wireless stereo earbuds, a first audio signal,
    converting, by the first true wireless stereo earbud, the first audio signal into a first digital audio signal in a pulse code modulation (PCM) format by using an analog-to-digital converter and pulse code modulation,
    converting, by a second true wireless stereo earbud, a second audio signal into a second digital audio signal in the PCM format by using the analog-to-digital converter and the pulse code modulation, wherein a mobile terminal performs noise reduction, filtering, sampling rate conversion, and bit width conversion on the first digital audio signal and the second digital audio signal, and
    transmitting, by the first true wireless stereo earbud, the first digital audio signal to the mobile terminal.

2. The recording method according to claim 1, further comprising:

collecting, by the second true wireless stereo earbud of the true wireless stereo earbuds, the second audio signal;

converting, by the second true wireless stereo earbud, the second audio signal into the second digital audio signal in a PCM format; and transmitting the second digital audio signal to the first true wireless stereo earbud, wherein the first true wireless stereo earbud transmits the first digital audio signal and the second digital audio signal to the mobile terminal.

3. The recording method according to claim 2, further comprising:

performing, by the first true wireless stereo earbud, delay alignment on the first digital audio signal and the second digital audio signal.

4. The recording method according to claim 1, wherein a priority of the first true wireless stereo earbud is set to be higher than a second true wireless stereo earbud.

5. The recording method according to claim 1, wherein a manner of communication between the first true wireless stereo earbud and the mobile terminal is Bluetooth communication, and a manner of communication between the first true wireless stereo earbud and a second true wireless stereo earbud is Bluetooth communication.

6. The recording method according to claim 1, wherein the mobile terminal is configured to perform following operations:

receiving the first digital audio signal;

collecting a third audio signal, and converting the third audio signal into a third digital audio signal;

decoding the first digital audio signal, and performing delay alignment on a decoded first digital audio signal and the third digital audio signal; and performing collaborative noise reduction on the first digital audio signal and the third digital audio signal obtained after the delay alignment, to obtain a recording signal.

7. The recording method according to claim 2, wherein the mobile terminal is configured to perform following operations:

receiving the first digital audio signal and the second digital audio signal;

collecting a third audio signal, and converting the third audio signal into a third digital audio signal;

decoding the first digital audio signal and the second digital audio signal, and performing delay alignment on a decoded first digital audio signal, a decoded second digital audio signal, and the third digital audio signal; and performing collaborative noise reduction on the first digital audio signal, the second digital audio signal, and the third digital audio signal obtained after the delay alignment, to obtain a recording signal.

8. The recording method according to claim 2, further comprising:

receiving and decoding, by the first true wireless stereo earbud, a first accompaniment audio signal from the mobile terminal; and/or receiving and decoding, by the second true wireless stereo earbud, a second accompaniment audio signal from the mobile terminal;

performing, by the first true wireless stereo earbud, audio mixing on a decoded first accompaniment audio signal and the first digital audio signal, to obtain a first audio mixing signal; and/or performing, by the second true wireless stereo earbud, audio mixing on a decoded second accompaniment audio signal and the second digital audio signal, to obtain a second audio mixing signal; and converting, by the first true wireless stereo earbud, the first audio mixing signal into an analog audio mixing signal, and playing the analog audio mixing signal by using a speaker of the first true wireless stereo earbud; and/or converting, by the second true wireless stereo earbud, the second audio mixing signal into an analog audio mixing signal, and playing the analog audio mixing signal by using a speaker of the second true wireless stereo earbud.

9. The recording method according to claim 8, further comprising:

performing delay alignment before the first true wireless stereo earbud plays the first audio mixing signal and the second true wireless stereo earbud plays the second audio mixing signal, so that the first audio mixing signal and the second audio mixing signal are synchronously played.

10. The recording method according to claim 3, further comprising:

receiving and decoding, by the first true wireless stereo earbud, an accompaniment audio signal from the mobile terminal;

performing, by the first true wireless stereo earbud, audio mixing on the second digital audio signal, the first digital audio signal, and a decoded accompaniment audio signal, to obtain an audio mixing signal;

converting, by the first true wireless stereo earbud, the audio mixing signal into a first analog audio mixing signal, and playing the first analog audio mixing signal by using a speaker of the first true wireless stereo earbud;

sending, by the first true wireless stereo earbud, the audio mixing signal to the second true wireless stereo earbud; and decoding, by the second true wireless stereo earbud, the audio mixing signal, converting a decoded audio mixing signal into a second analog audio mixing signal, and playing the second analog audio mixing signal by using a speaker of the second true wireless stereo earbud.

11. The recording method according to claim 10, further comprising:

before the first true wireless stereo earbud plays the first analog audio mixing signal, performing, by the first true wireless stereo earbud, delay compensation on the first analog audio mixing signal, so that the first analog audio mixing signal and the second analog audio mixing signal are synchronously played.

12. A recording system, comprising:

a first true wireless stereo earbud to be wirelessly connected to a mobile terminal, wherein the first true wireless stereo earbud is configured to collect a first audio signal, convert the first audio signal into a first digital audio signal in a pulse code modulation (PCM) format by using an analog-to-digital converter and pulse code modulation, convert a second audio signal into a second digital audio signal in the PCM format by using the analog-to-digital converter and the pulse code modulation, wherein the mobile terminal performs noise reduction, filtering, sampling rate conversion, and bit width conversion on the first digital audio signal and the second digital audio signal, and transmit the first digital audio signal to the mobile terminal.

13. The recording system according to claim 12, further comprising:
a second true wireless stereo earbud wirelessly connected to the first true wireless stereo earbud and the mobile terminal, wherein the second true wireless stereo earbud is configured to:
collect the second audio signal,
convert the second audio signal into the second digital audio signal in the PCM format, and
transmit the second digital audio signal to the first true wireless stereo earbud, wherein the first true wireless stereo earbud transmits the first digital audio signal and the second digital audio signal to the mobile terminal.

14. The recording system according to claim 13, wherein a manner of communication between the first true wireless stereo earbud and the mobile terminal is Bluetooth communication, and a manner of communication between the first true wireless stereo earbud and a second true wireless stereo earbud is Bluetooth communication.

15. The recording system according to claim 12, wherein the mobile terminal is further configured to:
receive the first digital audio signal;
collect a third audio signal, and converting the third audio signal into a third digital audio signal;
decode the first digital audio signal, and perform delay alignment on a decoded first digital audio signal and the third digital audio signal; and
perform collaborative noise reduction on the first digital audio signal and the third digital audio signal obtained after the delay alignment, to obtain a recording signal.

16. The recording system according to claim 13, wherein the mobile terminal is further configured to:
receive the first digital audio signal and the second digital audio signal;
collect a third audio signal, and converting the third audio signal into a third digital audio signal;
decode the first digital audio signal and the second digital audio signal, and perform delay alignment on a decoded first digital audio signal, a decoded second digital audio signal, and the third digital audio signal; and
perform collaborative noise reduction on the first digital audio signal, the second digital audio signal, and the third digital audio signal obtained after the delay alignment, to obtain a recording signal.

17. The recording system according to claim 13, wherein the first true wireless stereo earbud receives and decodes a first accompaniment audio signal from the mobile terminal; and/or
the second true wireless stereo earbud receives and decodes a second accompaniment audio signal from the mobile terminal;
the first true wireless stereo earbud performs audio mixing on a decoded first accompaniment audio signal and the first digital audio signal, to obtain a first audio mixing signal; and/or
the second true wireless stereo earbud performs audio mixing on a decoded second accompaniment audio signal and the second digital audio signal, to obtain a second audio mixing signal; and
the first true wireless stereo earbud converts the first audio mixing signal into an analog audio mixing signal, and plays the analog audio mixing signal by using a speaker of the first true wireless stereo earbud; and/or
the second true wireless stereo earbud converts the second audio mixing signal into an analog audio mixing signal, and plays the analog audio mixing signal by using a speaker of the second true wireless stereo earbud.

18. The recording system according to claim 13, wherein the first true wireless stereo earbud receives and decodes an accompaniment audio signal from the mobile terminal;
the first true wireless stereo earbud performs audio mixing on the second digital audio signal, the first digital audio signal, and a decoded accompaniment audio signal, to obtain an audio mixing signal;
the first true wireless stereo earbud converts the audio mixing signal into a first analog audio mixing signal, and plays the first analog audio mixing signal by using a speaker of the first true wireless stereo earbud;
the first true wireless stereo earbud sends the audio mixing signal to the second true wireless stereo earbud; and
the second true wireless stereo earbud decodes the audio mixing signal, converts a decoded audio mixing signal into a second analog audio mixing signal, and plays the second analog audio mixing signal by using a speaker of the second true wireless stereo earbud.

\* \* \* \* \*